US011945199B2

United States Patent
Jeon et al.

(10) Patent No.: US 11,945,199 B2
(45) Date of Patent: *Apr. 2, 2024

(54) LAMINATED FILM, AND DISPLAY DEVICE INCLUDING SAME

(71) Applicants: SAMSUNG ELECTRONICS CO., LTD., Suwon-si (KR); SAMSUNG SDI CO., LTD., Yongin-si (KR)

(72) Inventors: Hyunjeong Jeon, Seoul (KR); A Ra Jo, Suwon-si (KR); Jungha Chae, Suwon-si (KR); Sun Jin Song, Seoul (KR); Boreum Jeong, Sejong-si (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/162,801

(22) Filed: Feb. 1, 2023

(65) Prior Publication Data

US 2023/0173798 A1 Jun. 8, 2023

Related U.S. Application Data

(63) Continuation of application No. 16/594,533, filed on Oct. 7, 2019, now Pat. No. 11,602,924.

(30) Foreign Application Priority Data

Oct. 8, 2018 (KR) .................. 10-2018-0120054

(51) Int. Cl.
*B32B 27/08* (2006.01)
*B32B 27/28* (2006.01)

(52) U.S. Cl.
CPC ............ *B32B 27/08* (2013.01); *B32B 27/281* (2013.01); *B32B 2250/03* (2013.01);
(Continued)

(58) Field of Classification Search
CPC ... B32B 27/08; B32B 27/281; B32B 2250/03; B32B 2255/10; B32B 2255/26;
(Continued)

(56) References Cited

U.S. PATENT DOCUMENTS

| 5,344,916 A | 9/1994 | Harris et al. |
| 5,480,964 A | 1/1996 | Harris et al. |

(Continued)

FOREIGN PATENT DOCUMENTS

| CN | 106967296 A | 7/2022 |
| JP | 7287102 A | 10/1995 |

(Continued)

OTHER PUBLICATIONS

English Translation of Office Action dated Aug. 19, 2022, of the corresponding Chinese Patent Application No. 201910950403.5, 12 pp.

(Continued)

*Primary Examiner* — John D Freeman
(74) *Attorney, Agent, or Firm* — CANTOR COLBURN LLP

(57) ABSTRACT

Disclosed are a laminated film including a light transmitting substrate; a hard coating layer; and an optical enhancement layer disposed between the light transmitting substrate and the hard coating layer or at a position facing the hard coating layer with the light transmitting substrate therebetween, wherein the light transmitting substrate includes a polyimide, a poly(amide-imide) copolymer, or a combination thereof, and the optical enhancement layer includes a copolymer comprising a polyimide, and a display device including the laminated film.

20 Claims, 5 Drawing Sheets

(52) U.S. Cl.
CPC ....... *B32B 2255/10* (2013.01); *B32B 2255/26* (2013.01); *B32B 2307/412* (2013.01); *B32B 2307/418* (2013.01); *B32B 2457/20* (2013.01)

(58) Field of Classification Search
CPC ........ B32B 2307/412; B32B 2307/418; B32B 2457/20; B32B 1/00; B32B 7/023; B32B 27/283; B32B 27/40; G02B 1/14; G02B 1/04; G02B 1/10; C08J 7/042; C08J 2379/08; C08J 2479/08; C08J 2483/04
See application file for complete search history.

(56) References Cited

U.S. PATENT DOCUMENTS

| | | | |
|---|---|---|---|
| 5,580,950 | A | 12/1996 | Harris et al. |
| 5,909,314 | A | 6/1999 | Oka et al. |
| 6,064,524 | A | 5/2000 | Oka et al. |
| 6,340,404 | B1 | 1/2002 | Oka et al. |
| 7,662,483 | B2 | 2/2010 | Horio et al. |
| 7,947,341 | B2 | 5/2011 | Nakamura et al. |
| 9,023,482 | B2 | 5/2015 | Lockridge et al. |
| 9,365,694 | B2 | 6/2016 | Cho et al. |
| 9,902,814 | B2 | 2/2018 | Jeon et al. |
| 9,951,250 | B2 | 4/2018 | Cho et al. |
| 10,809,421 | B2 | 10/2020 | Song et al. |
| 11,059,954 | B2 | 7/2021 | Jo et al. |
| 11,602,924 | B2 * | 3/2023 | Jeon .................. G02B 1/14 |
| 2006/0204678 | A1 | 9/2006 | Hayashi et al. |
| 2015/0316691 | A1 | 11/2015 | Nakayama et al. |
| 2017/0152358 | A1 | 6/2017 | Koh et al. |
| 2017/0342224 | A1 | 11/2017 | Chae et al. |
| 2020/0061981 | A1 | 2/2020 | Lim et al. |
| 2023/0173798 | A1 | 6/2023 | Jeon et al. |

FOREIGN PATENT DOCUMENTS

| | | |
|---|---|---|
| JP | 10508048 A | 8/1998 |
| JP | 11271526 A | 10/1999 |
| JP | 2013195550 A | 9/2013 |
| JP | 2014109635 A | 6/2014 |
| JP | 2016027146 A | 2/2016 |
| JP | 2016125063 A | 7/2016 |
| JP | 20170119867 A | 7/2017 |
| JP | 2018065387 A | 4/2018 |
| JP | 2018119144 A | 8/2018 |
| JP | 2018180274 A | 11/2018 |
| JP | 2020520826 A | 7/2020 |
| KR | 0141287 A | 3/1998 |
| KR | 1020060036894 A | 5/2006 |
| KR | 1020060051536 A | 5/2006 |
| KR | 1020080003342 A | 1/2008 |
| KR | 20140016199 A | 2/2014 |
| KR | 20150037334 A | 4/2015 |
| KR | 1020150094081 A | 8/2015 |
| KR | 1020160020686 A | 2/2016 |
| KR | 20170059900 A | 5/2017 |
| KR | 1020170132499 A | 12/2017 |
| TW | 201807435 A | 3/2018 |
| WO | 2006098363 A1 | 9/2006 |
| WO | 2018037490 A1 | 3/2018 |
| WO | 2018212545 A1 | 11/2018 |

OTHER PUBLICATIONS

Office Action dated Aug. 19, 2022, of the corresponding Chinese Patent Application No. 201910950403.5, 11 pp.
English Translation of Office Action dated Jul. 25, 2023 of the corresponding Korean Patent Application No. 10-2018-0120054, 14 pp.
English Translation of Office Action dated May 23, 2023 of the corresponding Japanese Patent Application No. 2019-185344, 7 pp.
Office Action dated Jul. 25, 2023 of the corresponding Korean Patent Application No. 10-2018-0120054, 12 pp.
Office Action dated May 23, 2023 of the corresponding Japanese Patent Application No. 2019-185344, 8 pp.

* cited by examiner

| | Control | Comparative Example1 | Comparative Example2 | Example1 |
|---|---|---|---|---|
| Mura photograph |  |  |  |  |
| Mura degree | None | Strong | Strong | Weak |
| Transmittance (%) | 88 | 88 | 89 | 90 |
| YI | 3.0 | 3.1 | 2.3 | 2.8 |
| haze | 0.7 | 0.9 | 0.5 | 0.8 |

| | Example 2 | Example 3 | Example 4 | Example 5 | Example 6 |
|---|---|---|---|---|---|
| Mura photograph |  |  |  |  |  |
| Mura degree | Weak | Weak | Weak | Weak | Weak |
| Transmittance (%) | 90 | 90 | 90 | 90 | 90 |
| YI | 2.3 | 2.5 | 2.4 | 2.8 | 1.5 |
| haze | 1.0 | 1.6 | 1.5 | 0.8 | 0.9 |

LAMINATED FILM, AND DISPLAY DEVICE INCLUDING SAME

CROSS-REFERENCE TO RELATED APPLICATION

This continuation application claims priority to U.S. application Ser. No. 16/594,533 filed Oct. 7, 2019, now U.S. Pat. No. 11,602,924, which claims priority to Korean Patent Application No. 10-2018-0120054 filed in the Korean Intellectual Property Office on Oct. 8, 2018, and all the benefits accruing therefrom under 35 U.S.C. § 119, the contents of which in their entirety are herein incorporated by reference.

BACKGROUND

1. Field

A laminated film and a display device including the laminated film are disclosed.

2. Description of the Related Art

Portable display devices such as a smart phone or a tablet PC have been actively researched according to the high performance and popularization thereof. For example, lightweight, flexible (i.e., bendable or foldable) and portable display devices have been studied and developed to be commercialized. The portable display device of a liquid crystal display or the like includes a protective window for protecting a display module such as a liquid crystal layer. Currently, most portable display devices include a window including a rigid glass substrate. However, glass is fragile and is easily broken by the exterior impact, when applied to a portable display device or the like, and also glass is not flexible, so it may be not suitable for a flexible display device. Therefore, it has been attempted to substitute a protective window with a plastic film in a display device.

However, the plastic film is needed to further improve mechanical properties such as hardness and optical properties in order to be applied for the protective window in a display device and simultaneously to have high appearance quality.

SUMMARY

An embodiment provides a laminated film in which interfacial reflections and generation of interference fringes are suppressed to improve optical characteristics and visibility.

Another embodiment provides a display device including a laminated film having improved optical characteristics and visibility.

An embodiment provides a laminated film including a light transmitting substrate; a hard coating layer; and an optical enhancement layer disposed between the light transmitting substrate and the hard coating layer or at a position facing the hard coating layer with the light transmitting substrate therebetween, wherein the light transmitting substrate includes a polyimide, a poly(amide-imide) copolymer, or a combination thereof, and the optical enhancement layer includes a copolymer including a polyimide.

A refractive index of the optical enhancement layer may have a value between a refractive index of the light transmitting substrate and a refractive index of the hard coating layer.

The optical enhancement layer may have a refractive index of about 1.5 to about 1.7.

The copolymer including a polyimide of the optical enhancement layer may include (a) an imide structural unit, and (b) a urethane structural unit, a siloxane structural unit, an amide structural unit, or a combination thereof.

The imide structural unit may be represented by Chemical Formula 1:

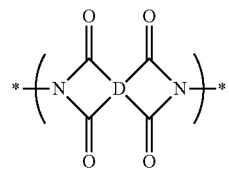

(Chemical Formula 1)

In Chemical Formula 1,

D is a substituted or unsubstituted quadrivalent C4 to C30 alicyclic organic group, a substituted or unsubstituted quadrivalent C6 to C30 aromatic organic group, a substituted or unsubstituted quadrivalent C4 to C30 heteroaromatic organic group, or a combination thereof, and the alicyclic organic group, the aromatic organic group, the heteroaromatic organic group, or the combination thereof is a single ring, a condensed ring in which at least two rings are fused, or a ring system including at least two rings of the single ring and the condensed ring, which are linked by a single bond, a fluorenylene group, —O—, —S—, —C(=O)—, —CH(OH)—, —S(=O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, —(CH$_2$)$_p$—C(CnF$_{2n+1}$)$_2$—(CH$_2$)$_q$— (wherein 1≤n≤10, 1≤p≤10 and 1≤q≤10), —C(CF$_3$)(C$_6$H$_5$)—, —C(=O)NH—, or a combination thereof.

The urethane structural unit may be represented by Chemical Formula 2:

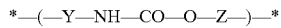

(Chemical Formula 2)

In Chemical Formula 2,

Y and Z are each independently a substituted or unsubstituted divalent C1 to C30 aliphatic organic group, a substituted or unsubstituted divalent C3 to C30 alicyclic organic group, a substituted or unsubstituted C6 to C30 aromatic organic group, a substituted or unsubstituted C2 to C30 heteroaromatic organic group, or a combination thereof, and the alicyclic organic group, the aromatic organic group, the heteroaromatic organic group, or the combination thereof may be a single ring, a condensed ring in which at least two rings are fused, or a ring system including at least two rings of the single ring and the condensed ring, which are linked by a single bond, a fluorenylene group, —O—, —S—, —C(=O)—, —CH(OH)—, —S(=O)$_2$—, —Si(CH$_3$)$_2$—, —(CH$_2$)p—, —(CF$_2$)$_q$—, —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, —(CH$_2$)$_p$—C(C$_n$F$_{2n+1}$)$_2$—(CH$_2$)$_q$— (wherein 1≤n≤10, 1≤p≤10 and 1≤q≤10), —C(CF$_3$)(CH$_5$)—, —C(=O)NH—, or a combination thereof.

The siloxane structural unit may be represented by Chemical Formula 3:

(Chemical Formula 3)

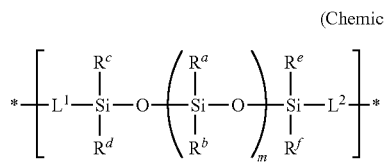

In Chemical Formula 3, $R^a$ to $R^f$ are each independently a substituted or unsubstituted C1 to C30 alkyl group, a substituted or unsubstituted C2 to C30 alkenyl group, a substituted or unsubstituted C2 to C30 alkynyl group, a substituted or unsubstituted C1 to C30 alkoxy group, a substituted or unsubstituted C3 to C30 cycloalkyl group, a substituted or unsubstituted C6 to C30 aryl group, an epoxy group-containing group, or a combination thereof, $L^1$ and $L^2$ are each independently a single bond, —O—, a substituted or unsubstituted C1 to C30 alkylene group, a substituted or unsubstituted C1 to C30 heteroalkylene group, a substituted or unsubstituted C2 to C30 alkenylene group, a substituted or unsubstituted C3 to C30 cycloalkylene group, a substituted or unsubstituted C2 to C30 heterocycloalkylene group, a substituted or unsubstituted C6 to C30 aryl group, a substituted or unsubstituted C2 to C30 heteroaryl group, or a combination thereof, and m is an integer from 0 to 150.

The amide structural unit may be represented by Chemical Formula 4:

(Chemical Formula 4)

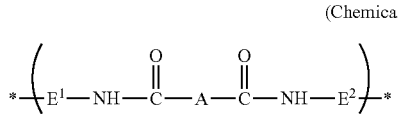

In Chemical Formula 4,

A, $E^1$, and $E^2$ are each independently a substituted or unsubstituted divalent C1 to C30 aliphatic organic group, a substituted or unsubstituted divalent C3 to C30 alicyclic organic group, a substituted or unsubstituted divalent C6 to C30 aromatic organic group, a substituted or unsubstituted divalent C2 to C30 heteroaromatic organic group, or a combination thereof, and the alicyclic organic group, aromatic organic group, heteroaromatic organic group, or the combination thereof is a single ring, a condensed ring in which at least two rings are fused, or a ring system including at least two rings of the single ring and the condensed ring, which are linked by a single bond, a fluorenylene group, —O—, —S—, —C(=O)—, —CH(OH)—, —S(=O)$_2$—, —Si(CH$_3$)$_2$—, —(CH$_2$)$_p$—, —(CF$_2$)$_q$—, —C(C$_n$H$_{2n+1}$)$_2$—, —C(CnF$_{2n+1}$)$_2$—, —(CH$_2$)$_p$—C(C$_n$H$_{2n+1}$)$_2$—(CH$_2$)$_q$—, —(CH$_2$)$_p$—C(CnF$_{2n+1}$)$_2$—(CH$_2$)$_q$— (wherein 1≤n≤10, 1≤p≤10 and 1≤q≤10), —C(CF$_3$)(C$_6$H$_5$)—, —C(=O)NH—, or a combination thereof.

The optical enhancement layer may further include partially condensed (incompletely condensed) polyhedral oligomer silsesquioxane (POSS) including a functional group capable of forming a hydrogen bond at the broken site of at least one —Si—O—Si— bond.

The partially condensed polyhedral oligomer silsesquioxane including a functional group capable of forming a hydrogen bond at the broken site of at least one —Si—O—Si— bond may be represented by Chemical Formula 5 or Chemical Formula 6:

(Chemical Formula 5)

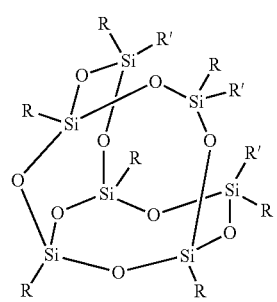

(Chemical Formula 6)

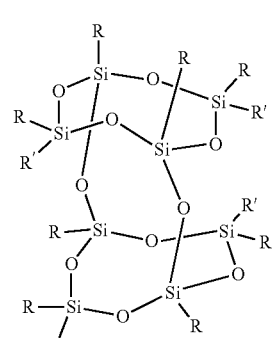

In Chemical Formula 5 and Chemical Formula 6,

R is each independently a substituted or unsubstituted C1 to C30 alkyl group, a substituted or unsubstituted C3 to C30 cycloalkyl group, a substituted or unsubstituted C6 to C30 aryl group, or a combination thereof, and R' is each independently —OH, —SH, or —NH$_2$.

The partially condensed polyhedral oligomer silsesquioxane including a functional group capable of forming a hydrogen bond at the broken site of at least one —Si—O—Si— bond may be included in an amount of less than or equal to about 20 parts by mass based on 100 parts by mass of the polyimide copolymer in the optical enhancement layer.

The hard coating layer may include a silicon-containing polymer, a urethane-containing polymer, an acrylate-containing polymer, an epoxy-containing polymer, or a combination thereof.

The hard coating layer may include a silicon-containing polymer and the silicon-based polymer may include organopolysiloxane.

The light transmitting substrate may include polyimide including an imide structural unit represented by Chemical Formula 1, or a poly(amide-imide) copolymer including an imide structural unit represented by Chemical Formula 1 and an amide structural unit represented by Chemical Formula 4, or a combination thereof:

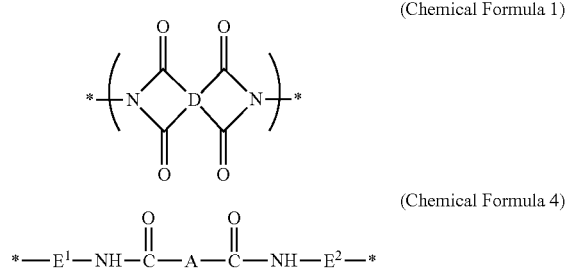

Chemical Formula 1 and Chemical Formula 4 are the same as defined above.

A thickness of the light transmitting substrate may be about 30 μm to about 300 μm, a thickness of the hard coating layer may be about 1 μm to about 30 μm, and a thickness of the optical enhancement layer may be about 0.1 μm to about 10 μm.

The laminated film may have a transmittance of greater than or equal to about 90%.

The laminated film may have a YI of less than about 3.

The laminated film may have a haze of less than or equal to about 2.

When a reflectance of the laminated film is measured at an incident angle of 45 degrees after attaching the laminated film to a black reflector, an average amplitude of the laminated film in a visible light region may be less than or equal to about 0.1%.

Another embodiment provides a display device including the laminated film according to the embodiment.

The laminated film according to an embodiment suppresses the generation of interfacial reflections and interference fringes, thereby improving optical characteristics and visibility, and thus exhibits excellent appearance quality, and thus may be usefully used as a window of a flexible display device.

DETAILED DESCRIPTION

Figure 1:
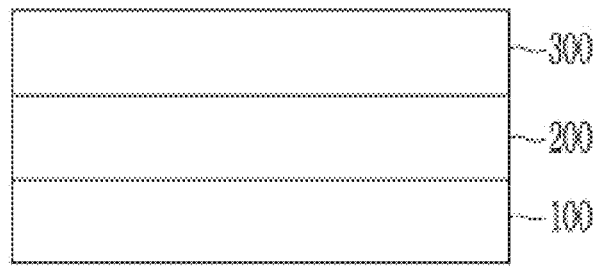
FIG. 1 is a schematic cross-sectional view of a laminated film according to an embodiment in which a light transmitting substrate 100, an optical enhancement layer 200, and a hard coating layer 300 are sequentially laminated.

Hereinafter, embodiments are described in detail. However, these embodiments are exemplary, the present invention is not limited thereto and the present invention is defined by the scope of claims.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a," "an," "the," and "at least one" do not denote a limitation of quantity, and are intended to cover both the singular and plural, unless the context clearly indicates otherwise. For example, "an element" has the same meaning as "at least one element," unless the context clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As used herein, when specific definition is not otherwise provided, "substituted" refers to replacement of at least one hydrogen of a given functional group by a substituent a halogen atom (F, Cl, Br, or I), a hydroxy group, a nitro group, a cyano group, an amino group —$NH_2$, —$NH(R^{100})$, or —$N(R^{101})(R^{102})$ wherein $R^{100}$, $R^{101}$, and $R^{102}$ are the same or different, and are each independently a C1 to C10 alkyl group), an amidino group, a hydrazine group, a hydrazone group, a carboxyl group, an ester group, a ketone group, a substituted or unsubstituted alkyl group, a substituted or unsubstituted alicyclic organic group (e.g., cycloalkyl group, etc.), a substituted or unsubstituted aryl group (e.g., benzyl group, naphthyl group, fluorenyl group, etc.), a substituted or unsubstituted alkenyl group, a substituted or unsubstituted alkynyl group, a substituted or unsubstituted heteroaryl group and a substituted or unsubstituted heterocyclic group, or the substituents may be linked with each other to form a ring.

As used herein, when specific definition is not otherwise provided, "alkyl group" refers to a C1 to C30 alkyl group, and specifically a C1 to C15 alkyl group, "cycloalkyl group" refers to a C3 to C30 cycloalkyl group, and specifically a C3 to C18 cycloalkyl group, "alkoxy group" refers to a C1 to C30 alkoxy group, and specifically a C1 to C18 alkoxy group, "ester group" refers to a C2 to C30 ester group, and specifically a C2 to C18 ester group, "ketone group" refers to a C3 to C30 ketone group, and specifically a C3 to C18 ketone group, "aryl group" refers to a C6 to C30 aryl group, and specifically a C6 to C18 aryl group, and "alkenyl group" refers to a C2 to C30 alkenyl group, and specifically a C2 to C18 alkenyl group.

As used herein, when a specific definition is not otherwise provided, the term "aliphatic organic group" refers to a C1 to C30 alkyl group, a C2 to C30 alkenyl group, a C2 to C30 alkynyl group, a C1 to C30 alkylene group, a C2 to C30 alkenylene group, or a C2 to C30 alkynylene group, specifically a C1 to C15 alkyl group, a C2 to C15 alkenyl group, a C2 to C15 alkynyl group, a C1 to C15 alkylene group, a C2 to C15 alkenylene group, or a C2 to C15 alkynylene group.

As used herein, when a specific definition is not otherwise provided, the term "C3 to C30 alicyclic organic group" refers to a C3 to C30 cycloalkyl group, a C3 to C30 cycloalkenyl group, a C3 to C30 cycloalkynyl group, a C3 to C30 cycloalkylene group, a C3 to C30 cycloalkenylene group, or a C3 to C30 cycloalkynylene group, specifically a C3 to C15 cycloalkyl group, a C3 to C15 cycloalkenyl group, a C3 to C15 cycloalkynyl group, a C3 to C15 cycloalkylene group, a C3 to C15 cycloalkenylene group, or a C3 to C15 cycloalkynylene group.

As used herein when a definition is not otherwise provided, the term "aromatic organic group" refers to a C6 to C30 group comprising one aromatic ring, two or more aromatic rings fused together to provide a condensed ring system, or a combination thereof (e.g., a single aromatic ring or a condensed ring system), linked through a single bond, a fluorenylene group, —O—, —S—, —C(=O)—, —CH(OH)—, —S(=O)$_2$—, —Si(CH$_3$)$_2$—, —(CH$_2$)$_p$—, wherein 1≤p≤10, (CF$_2$)$_q$, wherein 1≤q≤10, —C(CH$_3$)$_2$—, —C(CF$_3$)$_2$—, and —C(=O)NH—, and specifically through —S(=O)$_2$—, for example an aryl group or a C6 to C30 arylene group, specifically a C6 to C16 aryl group or a C6 to C16 arylene group such as phenylene. An example of an aromatic organic group is a fluorenylene group.

As used herein when a definition is not otherwise provided, the term "heteroaromatic organic group" refers to a C2 to C30 group that includes one or more aromatic rings, in which at least one ring member (e.g., one, two or three ring members) is a heteroatom of N, O, P, Si, Se, Ge, or S. In a C2 to C30 heteroaromatic organic group, the total number of ring carbon atoms ranges from 2 to 30, with remaining ring atoms being heteroatoms. Multiple rings, if present, may be pendent, spiro or fused.

The term "C1 to C30 alkyl group" as used herein refers to a linear or branched saturated aliphatic hydrocarbon monovalent group having 1 to 30 carbon atoms, and examples thereof include a methyl group, an ethyl group, a propyl group, an isobutyl group, a sec-butyl group, a tert-butyl group, a pentyl group, an isoamyl group, and a hexyl group.

The term "C1 to C30 alkylene group" as used herein refers to a divalent group having the same structure as the C1 to C30 alkyl group.

The term "C1 to C30 alkoxy group" as used herein refers to a monovalent group represented by —OA$_{101}$ (wherein A$_{101}$ is the C1 to C30 alkyl group), and examples thereof include a methoxy group, an ethoxy group, and an isopropyloxy group.

The term "C2 to C30 alkenyl group" as used herein refers to a hydrocarbon group having at least one carbon-carbon double bond in the middle or at the terminus of the C2 to C30 alkyl group, and examples thereof include an ethenyl group, a propenyl group, and a butenyl group. The term "C2 to C30 alkenylene group" as used herein refers to a divalent group having the same structure as the C2 to C30 alkenyl group.

The term "C2 to C30 alkynyl group" as used herein refers to a hydrocarbon group having at least one carbon-carbon triple bond in the middle or at the terminus of the C2 to C30 alkyl group, and examples thereof include an ethynyl group, and a propynyl group. The term "C2 to C30 alkynylene group" as used herein refers to a divalent group having the same structure as the C2 to C30 alkynyl group.

The term "C3 to C30 cycloalkyl group" as used herein refers to a monovalent saturated hydrocarbon monocyclic group having 3 to 30 carbon atoms, and non-limiting examples thereof include a cyclopropyl group, a cyclobutyl group, a cyclopentyl group, a cyclohexyl group, a cycloheptyl group, a cyclooctyl group, an adamantyl group, a norbornenyl group, a cyclopentenyl group, a cyclohexenyl group, a cycloheptenyl group, a bicyclo[1.1.1]pentyl group, a bicyclo[2.1.1]hexyl group, a bicyclo[2.2.1]heptyl group, and a bicyclo[2.2.2]octyl group. The term "C3 to C30 cycloalkylene group" as used herein refers to a divalent group having the same structure as the C3 to C30 cycloalkyl group.

The term "C2 to C30 heterocycloalkyl group" as used herein refers to a monovalent saturated monocyclic group having N, O, P, Si, Se, Ge, S, or any combination thereof as a ring-forming atom and 2 to 30 carbon atoms, and non-limiting examples thereof include a tetrahydrofuranyl group and a tetrahydrothiophenyl group. The term "C2 to C30 heterocycloalkylene group" as used herein refers to a divalent group having the same structure as the C2 to C30 heterocycloalkyl group.

The term "C6 to C30 aryl group" as used herein refers to a monovalent group having a carbocyclic aromatic system having 6 to 30 carbon atoms, and the term "C6 to C30 arylene group" as used herein refers to a divalent group having a carbocyclic aromatic system having 6 to 30 carbon atoms. Non-limiting examples of the C6 to C30 aryl group include a phenyl group, a naphthyl group, an anthracenyl group, a phenanthrenyl group, a pyrenyl group, and a chrysenyl group. When the C6 to C30 aryl group and the C6 to C30 arylene group each include two or more rings, the rings may be fused to each other.

The term "C2 to C30 heteroaryl group" as used herein refers to a monovalent group having a heterocyclic aromatic system that has N, O, P, Si, Se, Ge, S, or any combination thereof as a ring-forming atom, in addition to 2 to 30 carbon atoms. The term "C2 to C30 heteroarylene group" as used herein refers to a divalent group having a heterocyclic aromatic system that has N, O, P, Si, Se, Ge, S, or any combination thereof as a ring-forming atom, in addition to 2 to 30 carbon atoms. Non-limiting examples of the C2 to C30 heteroaryl group include a pyridinyl group, a pyrimidinyl group, a pyrazinyl group, a pyridazinyl group, a triazinyl group, a quinolinyl group, and an isoquinolinyl group. When the C2 to C30 heteroaryl group and the C2 to C30 heteroarylene group each include two or more rings, the rings may be fused to each other.

As used herein, when specific definition is not otherwise provided, the term "combination" refers to mixing or copolymerization. Herein, "copolymerization" refers to a random copolymerization, a block copolymerization, or a graft copolymerization.

As used herein, the term "polyimide" refers to "polyimide", "polyamic acid," or a combination thereof as well as "polyimide" itself. The terms "polyimide" and "polyamic acid" may be understood to have the same meanings.

In addition, as used herein, "*" refers to a portion of attachment to other atom or other chemical formula.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it may be directly on the other element or intervening elements may also be present. In contrast, when an element is referred to as being "directly on" another element, there are no intervening elements present.

An embodiment provides a laminated film that may be used as a cover window protecting a display device such as a flexible display device or a foldable display device.

A glass substrate has been conventionally used for protecting the display device, but when requiring flexible and foldable characteristics of freely bending a shape, it is necessary to use a plastic material having hardness and strength as a window of a display device and also having light transmittance, color or the like similar to those of the glass substrate so as to function as a display device. A cover window for a display device requires high appearance quality as well as high optical characteristics, durability, and flexural property.

Research on a use of a polyimide-based transparent film that is a plastic material but has high durability and heat resistance, as well as satisfies optical characteristics to some extent has been studied. Here, a laminated film including a hard coating layer added on a polyimide substrate in order to obtain hardness comparable to that of glass has been attempted. However, due to the lamination of the two layers having different refractive indexes, an interference phenomenon may occur, and a difference of the thickness and refractive index of each layer may worsen the interference phenomenon and may cause a strong rainbow phenomenon on the film surface. Even though the inherent characteristics of the material, such as refractive index, of the layers may be identical, a thickness deviation or a partial mixing of the materials of the layers during the film forming process may occur, and may modify the rainbow phenomenon. Resultantly, the rainbow phenomenon of an optical film is a phenomenon in which a reflectance varies or the viewing angle changes depending on a position of the wide region of the film, which may be observed with the naked eye.

It is known that a rainbow phenomenon of an optical film does not appear when a reflectance ripple amplitude is less than or equal to about 1% in the wavelength region of about 500 nm to about 600 nm, or when the maximum amplitude is less than 0.5% in an entire visible region. However, since a conventional reflectance measurement is performed in a wide measurement range of several millimeters or more, minute changes of the reflectance may further occur depending on the position in the visible wavelength region, and the inherent reflectance ripple that causes the rainbow phenomenon may be offset and may not appear. In addition, since the reflectance ripple amplitude is measured at a reflection angle of less than or equal to about 10°, it may be different from the rainbow phenomenon which is visually measured.

In an embodiment, in a laminated film including a light transmitting substrate and a hard coating layer, interfacial reflections and interference fringes between layers may be suppressed, and thereby a laminated film having improved optical characteristics and visibility may be provided. Since an average amplitude is less than or equal to 0.1% in a visible region, when a reflectance of the laminated film is measured at an incident angle of 45 degrees after attaching the laminated film to a black reflector, the laminated film according to an embodiment does not exhibit a surface rainbow phenomenon and exhibits improved optical characteristics and visibility.

In an embodiment, the laminated film includes a light transmitting substrate; a hard coating layer; and an optical enhancement layer disposed between the light transmitting substrate and the hard coating layer or at a position facing the hard coating layer with the light transmitting substrate therebetween, wherein the light transmitting substrate includes a polyimide, a poly(amide-imide) copolymer, or a combination thereof, and the optical enhancement layer includes a copolymer including a polyimide.

Figure 2:
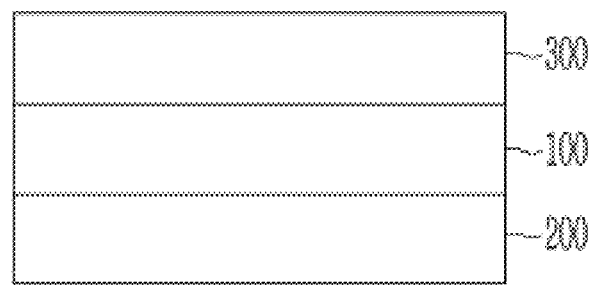
FIG. 2 is a schematic cross-sectional view of a laminated film according to another embodiment in which an optical enhancement layer 200, a light transmitting substrate 100, and a hard coating layer 300 are sequentially laminated.

FIGS. 1 and 2 show cross-sections of the laminated film according to an embodiment schematically.

Referring to FIG. 1, an optical enhancement layer 200 including a copolymer including a polyimide may be disposed on a light transmitting substrate 100 including a polyimide, a poly(amide-imide) copolymer, or a combination thereof, and a hard coating layer 300 is disposed on the optical enhancement layer 200.

Referring to FIG. 2, a hard coating layer 300 may be directly disposed on a light transmitting substrate 100 including a polyimide, a poly(amide-imide) copolymer, or a combination thereof, and an optical enhancement layer 200 including a copolymer including a polyimide may be disposed at an opposed surface to the surface on which a hard coating layer 300 is disposed of the light transmitting substrate 100.

The laminated films according to FIGS. 1 and 2 both include a light transmitting substrate 100, a hard coating layer 300, and an optical improving layer 200, but there is a difference in the position of the optical enhancement layer 200 in the laminated films wherein the optical enhancement layer 200 is disposed between the light transmitting substrate 100 and the hard coating layer 300 (FIG. 1) or wherein the optical enhancement layer 200 faces the hard coating layer 300 with the light transmission substrate 200 therebetween (FIG. 2). Even though the optical enhancement layer 200 is disposed at different positions in the laminated films as above, as clearly shown in the following examples and comparative examples, in the two cases including optical enhancement layer 200, when observing the surface of the laminated film, that is, the hard coated surface, the rainbow phenomenon is substantially reduced as compared with the laminated film without the optical enhanced layer 200.

Optical enhancement layer 200 may have a refractive index between a refractive index of light transmitting substrate 100 and a refractive index of hard coating layer 300.

In this case, the laminated film according to an embodiment does not show a rainbow phenomenon, and may have improved visibility and optical characteristics.

In an embodiment, the optical enhancement layer 200 may have a refractive index of about 1.5 to about 1.7. When the laminated film according to an embodiment includes a polyimide film as the light transmitting substrate 100, and a silicon-containing polymer, a urethane-containing polymer, an acrylate-containing polymer, an epoxy-containing polymer, a polycaprolactone, a urethane-acrylate copolymer, polyrotaxane, a silica-containing inorganic hard coating material, or a combination thereof as the hard coating layer 300, a refractive index of the polyimide film is about 1.55 to about 1.75, and a refractive index of the hard coating layer is about 1.5 to about 1.6, such that the optical enhancement layer 200 may be adjusted to have a value between the refractive indexes of the two layers.

In an embodiment, the light transmitting substrate 100 may have a refractive index of about 1.6 to about 1.75, for example, about 1.65 to about 1.72, or about 1.67 to about 1.7, the hard coating layer 300 may have a refractive index of about 1.5 to about 1.6, for example, about 1.5 to about 1.59, about 1.5 to about 1.57, about 1.5 to about 1.55, about 1.5 to about 1.53, or about 1.5 to about 1.52, and the optical enhancement layer 200 may have a refractive index of about 1.5 to about 1.7, for example, greater than 1.5 and less than or equal to about 1.7, for example, about 1.51 to about 1.69, about 1.52 to about 1.68, about 1.55 to about 1.65, about 1.57 to about 1.63, about 1.58 to about 1.61, or about 1.58 to about 1.6. As long as the refractive index of the optical enhancement layer 200 may be between the refractive index of the light transmitting substrate 100 and the refractive index of the hard coating layer 300, the refractive index of each layer is not limited to the above values.

The copolymer including polyimide of the optical enhancement layer may include (a) an imide structural unit, and (b) a urethane structural unit, a siloxane structural unit, an amide structural unit, or a combination thereof.

For example, the optical enhancement layer may include a poly(imide-urethane) copolymer including an imide structural unit and a urethane structural unit.

The optical enhancement layer may include a poly(imide-siloxane) copolymer including an imide structural unit and a siloxane structural unit.

The optical enhancement layer may include a poly(imide-amide) copolymer including an imide structural unit and an amide structural unit.

The optical enhancement layer may include a copolymer including (a) an imide structural unit, and (b) at least two structural units of a urethane structural unit, a siloxane structural unit, and an amide structural unit.

The optical enhancement layer may include a copolymer including an imide structural unit, a urethane structural unit, a siloxane structural unit, and an amide structural unit.

The imide structural unit may be represented by Chemical Formula 1:

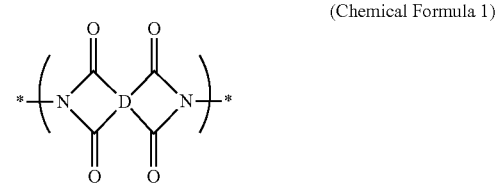

(Chemical Formula 1)

In Chemical Formula 1,

D is a substituted or unsubstituted quadrivalent C4 to C30 alicyclic organic group, a substituted or unsubstituted quadrivalent C6 to C30 aromatic organic group, or a substituted or unsubstituted quadrivalent C4 to C30 heteroaromatic organic group, or a combination thereof, and the alicyclic organic group, the aromatic organic group, the heteroaromatic organic group, or the combination thereof may be a single ring, a condensed ring in which at least two rings are fused, or a ring system including at least two rings of the single ring and the condensed ring, wherein the at least two rings are linked by a single bond, or a fluorenylene group, —O—, —S—, —C(=O)—, —CH(OH)—, —S(=O)$_2$—, —Si(CH$_3$)$_2$—, —(CH$_2$)$_p$—, —(CF$_2$)$_q$—, —C(C$_n$H$_{2n+1}$)$_2$—, —C(CnF$_{2n+1}$)$_2$—, —(CH$_2$)$_p$—C(C$_n$H$_{2n+1}$)$_2$—(CH$_2$)$_q$—, —(CH$_2$)$_p$—C(CnF$_{2n+1}$)$_2$—(CH$_2$)$_q$— (wherein 1≤n≤10, 1≤p≤10 and 1≤q≤10), —C(CF$_3$)(C$_6$H$_5$)—, —C(=O)NH—, or a combination thereof.

D of Chemical Formula 1 may be Chemical Formulae of Group 1:

(Group 1)

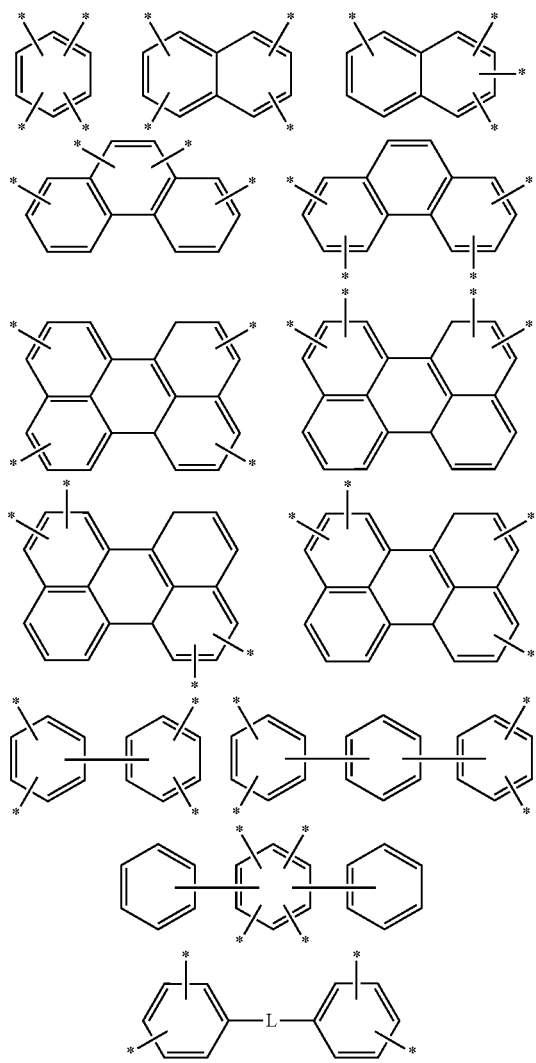

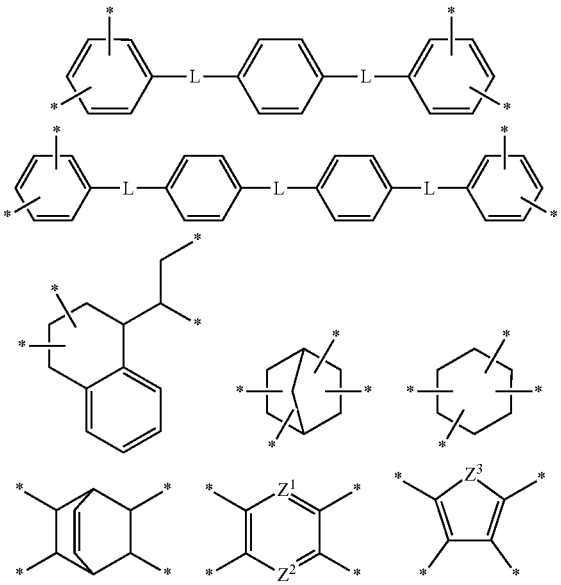

In the Chemical Formulae of Group 1, each of Chemical Formulae Group 1 may be substituted or unsubstituted, each L may be the same or different and may each independently be a single bond, a fluorenylene group, —O—, —S—, —C(=O)—, —CH(OH)—, —S(=O)$_2$—, —Si(CH$_3$)$_2$—, —(CH$_2$)$_p$—, —(CF$_2$)$_q$—, —C(C$_n$H$_{2n+1}$)$_2$—, —C(CnF$_{2n+1}$)$_2$—, —(CH$_2$)$_p$—C(C$_n$H$_{2n+1}$)$_2$—(CH$_2$)$_q$—, —(CH$_2$)$_p$—C(CnF$_{2n+1}$)$_2$—(CH$_2$)$_q$— (wherein 1≤n≤10, 1≤p≤10 and 1≤q≤10), —C(CF$_3$)(C$_6$H$_5$)—, —C(=O)NH—, or a combination thereof,

* is a linking point with an adjacent atom, $Z^1$ and $Z^2$ may be the same or different and each independently be —N= or —C(R$^{100}$)=, wherein R$^{100}$ is hydrogen or a C1 to C5 alkyl group, $Z^1$ and $Z^2$ are not simultaneously —C(R$^{100}$)=, and $Z^3$ is —O—, —S—, or —NR$^{101}$—, wherein R$^{101}$ is hydrogen or a C1 to C5 alkyl group.

The Chemical Formulae of Group 1 may be represented by the is Chemical Formulae of Group 2, but are not limited thereto:

(Group 2)

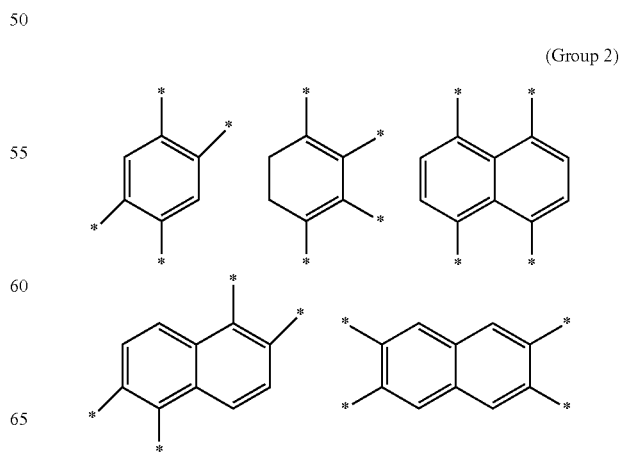

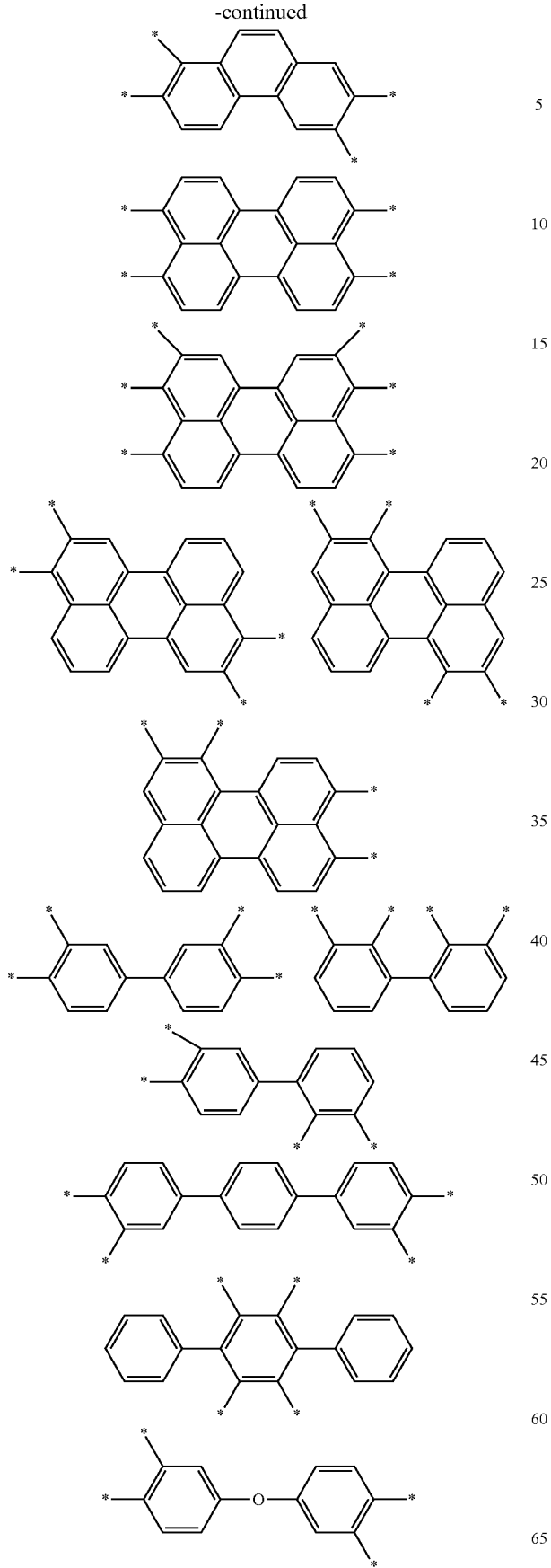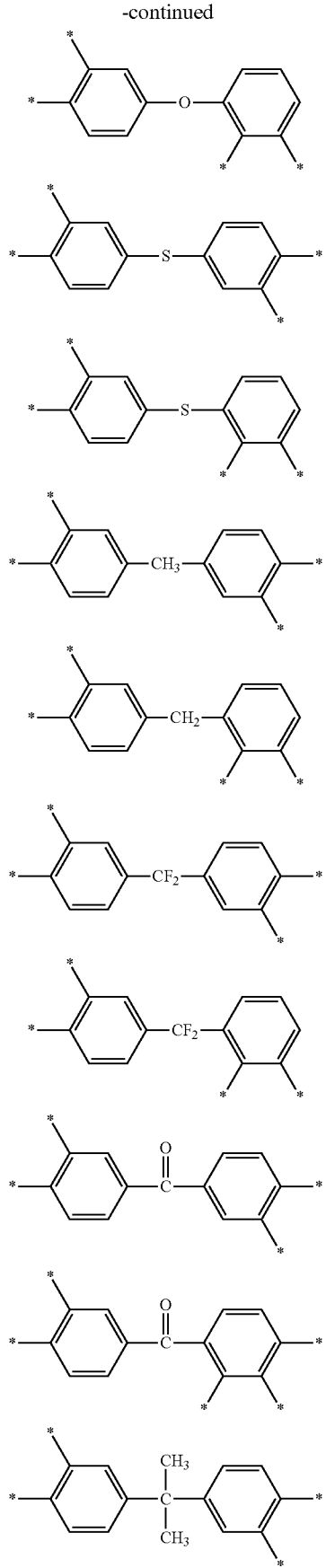

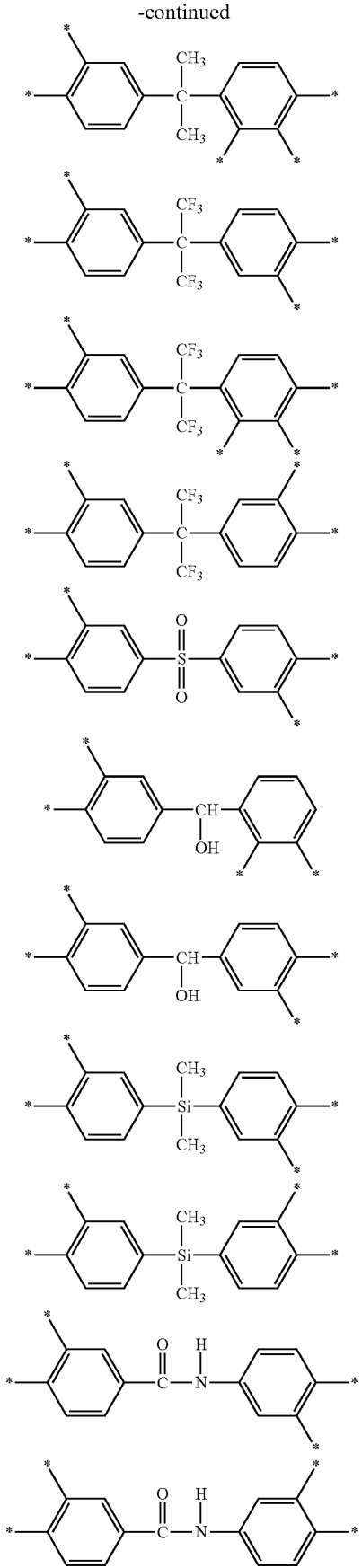
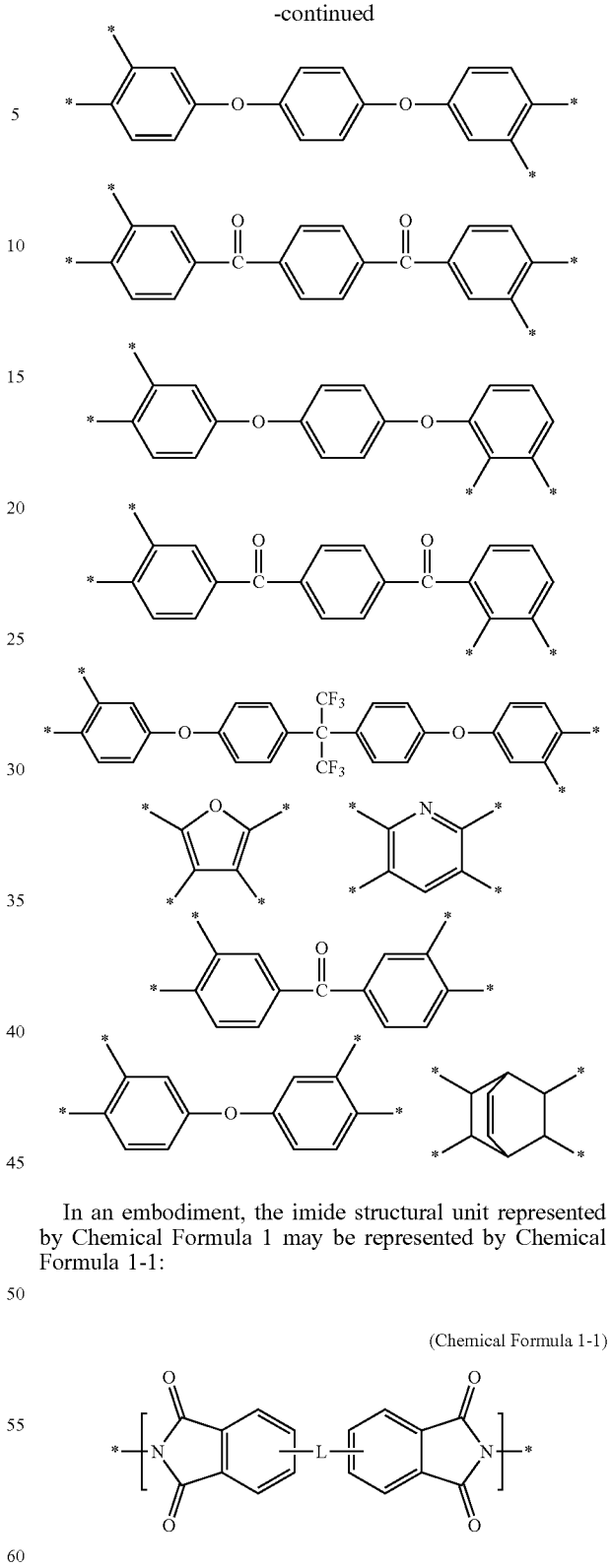

In an embodiment, the imide structural unit represented by Chemical Formula 1 may be represented by Chemical Formula 1-1:

(Chemical Formula 1-1)

In Chemical Formula 1-1, L is the same as defined in the Chemical Formulae of Group 1.

In an exemplary embodiment, the imide structural unit represented by Chemical Formula 1 may be represented by Chemical Formula 1-1, wherein L is at least one of a single bond, $-C(C_nH_{2n+1})_2-$, $-C(CnF_{2n+1})_2-$, $-(CH_2)_p-C(C_nH_{2n+1})_2-(CH_2)_q-$, or $-(CH_2)_p-C(CnF_{2n+1})_2-$ $(CH_2)_q$— (wherein $1 \leq n \leq 10$, $1 \leq p \leq 10$, and $1 \leq q \leq 10$), for example, Chemical Formula 1-1 may be a combination of L being a single bond and L being —$C(CnF_{2n+1})_2$— (wherein $1 \leq n \leq 10$).

In an embodiment, Chemical Formula 1-1 L may be a combination of a single bond and —$C(CF_3)_2$—.

The urethane structural unit may be represented by Chemical Formula 2:

*—(—Y—NH—CO—O—Z—)—*  (Chemical Formula 2)

In Chemical Formula 2,

Y and Z are each independently a substituted or unsubstituted divalent C1 to C30 aliphatic organic group, a substituted or unsubstituted divalent C3 to C30 alicyclic organic group, a substituted or unsubstituted C6 to C30 aromatic organic group, or a substituted or unsubstituted C2 to C30 heteroaromatic organic group, or a combination thereof, and the alicyclic organic group, the aromatic organic group, the heteroaromatic organic group, or the combination thereof may be a single ring, a condensed ring in which at least two rings are fused, or a ring system including at least two rings of the single ring and the condensed ring, wherein the at least two rings are linked by a single bond, a fluorenylene group, —O—, —S—, —C(=O)—, —CH(OH)—, —S(=O)$_2$—, —Si(CH$_3$)$_2$—, —(CH$_2$)$_p$—, —(CF$_2$)$_q$—, —C(C$_n$H$_{2n+1}$)$_2$—, —C(CnF$_{2n+1}$)$_2$—, —(CH$_2$)$_p$—C(C$_n$H$_{2n+1}$)$_2$—(CH$_2$)$_q$—, —(CH$_2$)$_p$—C(CnF$_{2n+1}$)$_2$—(CH$_2$)$_q$— (wherein $1 \leq n \leq 10$, $1 \leq p \leq 10$ and $1 \leq q \leq 10$), —C(CF$_3$)(CH$_5$)—, —C(=O)NH—, or a combination thereof.

In an embodiment, Y may be a substituted or unsubstituted divalent alicyclic organic group, or a substituted or unsubstituted divalent aromatic organic group, for example, a substituted divalent alicyclic organic group.

In an embodiment, Z may be a substituted or unsubstituted divalent C1 to C30 aliphatic organic group, or a substituted or unsubstituted divalent C6 to C30 aromatic organic group, for example, a substituted or unsubstituted divalent C1 to C20 aliphatic organic group. In an embodiment, Z may be a substituted or unsubstituted divalent C1 to C10 alkylene group.

The siloxane structural unit may be represented by Chemical Formula 3:

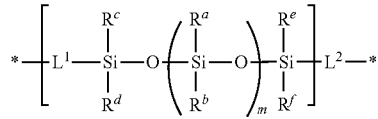

(Chemical Formula 3)

In Chemical Formula 3, $R^a$ to $R^f$ are each independently a substituted or unsubstituted C1 to C30 alkyl group, a substituted or unsubstituted C2 to C30 alkenyl group, a substituted or unsubstituted C2 to C30 alkynyl group, a substituted or unsubstituted C1 to C30 alkoxy group, a substituted or unsubstituted C3 to C30 cycloalkyl group, a substituted or unsubstituted C6 to C30 aryl group, an epoxy group-containing group, or a combination thereof, $L^1$ and $L^2$ are each independently a single bond, —O—, a substituted or unsubstituted C1 to C30 alkylene group, a substituted or unsubstituted C1 to C30 heteroalkylene group, a substituted or unsubstituted C2 to C30 alkenylene group, a substituted or unsubstituted C3 to C30 cycloalkylene group, a substituted or unsubstituted C2 to C30 heterocycloalkylene group, a substituted or unsubstituted C6 to C30 aryl group, a substituted or unsubstituted C2 to C30 heteroaryl group, or a combination thereof, and m is an integer from 0 to 150.

In an embodiment, $R^a$ to $R^f$ of Chemical Formula 3 may each independently be a substituted or unsubstituted C1 to C30 alkyl group, a substituted or unsubstituted C6 to C30 aryl group, or a combination thereof, $L^1$ and $L^2$ may each independently be a single bond, —O—, a substituted or unsubstituted C1 to C30 alkylene group, a substituted or unsubstituted C6 to C30 arylene group, or a combination thereof, and m may be an integer from 0 to 30.

In an embodiment, $R^a$ to $R^f$ of Chemical Formula 3 may each independently be a substituted or unsubstituted C1 to C4 alkyl group, a substituted or unsubstituted phenyl group, or a combination thereof, $L^1$ and $L^2$ may each independently be a single bond, —O—, a substituted or unsubstituted C1 to C10 alkylene group, a substituted or unsubstituted phenylene group, or a combination thereof, and m may be an integer from 0 to 10.

The amide structural unit may be represented by Chemical Formula 4:

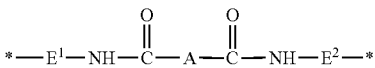

(Chemical Formula 4)

In Chemical Formula 4,

A, $E^1$, and $E^2$ are each independently a substituted or unsubstituted divalent C1 to C30 aliphatic organic group, a substituted or unsubstituted divalent C3 to C30 alicyclic organic group, a substituted or unsubstituted divalent C6 to C30 aromatic organic group, a substituted or unsubstituted divalent C2 to C30 heteroaromatic organic group, or a combination thereof, and the alicyclic organic group, aromatic organic group, heteroaromatic organic group, or the combination thereof is a single ring, a condensed ring in which at least two rings are fused, or a ring system including at least two rings of the single ring and the condensed ring, wherein the at least two rings are linked by a single bond, a fluorenylene group, —O—, —S—, —C(=O)—, —CH(OH)—, —S(=O)$_2$—, —Si(CH$_3$)$_2$—, —(CH$_2$)$_p$—, —(CF$_2$)$_q$—, —C(C$_n$H$_{2n+1}$)$_2$—, —C(CnF$_{2n+1}$)$_2$—, —(CH$_2$)$_p$—C(C$_n$H$_{2n+1}$)$_2$—(CH$_2$)$_q$—, —(CH$_2$)$_p$—C(CnF$_{2n+1}$)$_2$—(CH$_2$)$_q$— (wherein $1 \leq n \leq 10$, $1 \leq p \leq 10$ and $1 \leq q \leq 10$), —C(CF$_3$)(C$_6$H$_5$)—, —C(=O)NH—, or a combination thereof.

In an embodiment, A may be a substituted or unsubstituted divalent C6 to C30 aromatic organic group, wherein the aromatic organic group may be a single ring, a condensed ring in which at least two rings are fused, or a ring system including at least two rings of the single ring and the condensed ring, wherein the at least two rings are linked by a single bond, or —O—, —S—, —C(=O)—, —CH(OH)—, —S(=O)$_2$—, —Si(CH$_3$)$_2$—, —(CH$_2$)$_p$—, —(CF$_2$)$_q$—, —C(C$_n$H$_{2n+1}$)$_2$—, —C(CnF$_{2n+1}$)$_2$—, —(CH$_2$)$_p$—C(C$_n$H$_{2n+1}$)$_2$—(CH$_2$)$_q$—, —(CH$_2$)$_p$—C(CnF$_{2n+1}$)$_2$—(CH$_2$)$_q$— (wherein $1 \leq n \leq 10$, $1 \leq p \leq 10$, and $1 \leq q \leq 10$), —C(CF$_3$, C$_6$H$_5$)—, —C(=O)NH—, or a combination thereof.

In an embodiment, A may be of Chemical Formulae of Group 3:

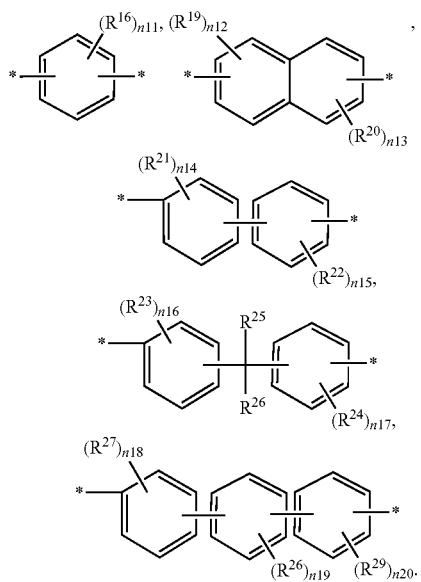
(Group 3)

In the Chemical Formulae of Group 3,
$R^{18}$ to $R^{29}$ are the same or different, and are each independently deuterium, a halogen, a substituted or unsubstituted C1 to C10 aliphatic organic group, or a substituted or unsubstituted C6 to C20 aromatic organic group,
n11 and n14 to n20 are each independently an integer ranging from 0 to 4, and
n12 and n13 are each independently an integer ranging from 0 to 3.

In an embodiment, A may be of Chemical Formulae of Group 4:

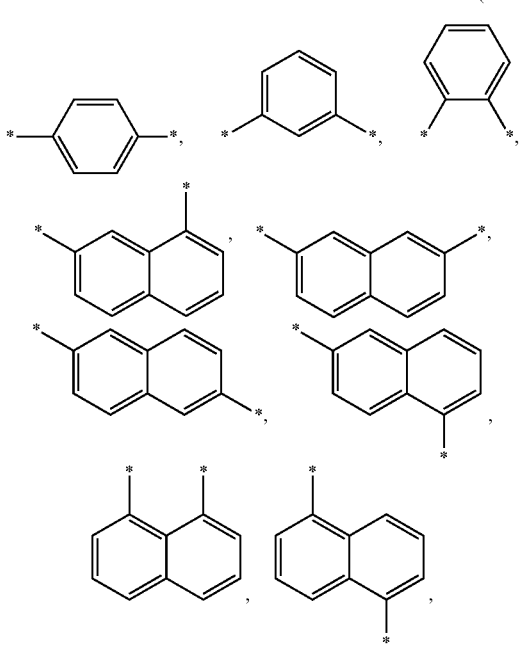
(Group 4)

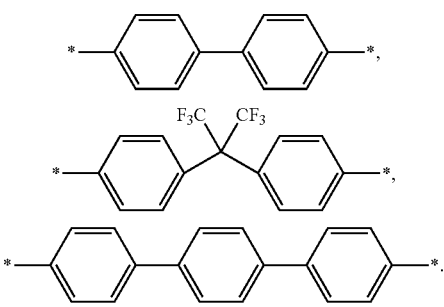

In an embodiment, A may be a substituted or unsubstituted phenylene group, a substituted or unsubstituted biphenylene group, or a combination thereof.

In an embodiment, $E^1$ and $E^2$ may each independently be a substituted or unsubstituted divalent C6 to C30 aromatic organic group, wherein the substituted or unsubstituted divalent C6 to C30 aromatic organic group may be a single ring, a condensed ring in which at least two rings are fused, or a ring system including at least two rings of the single ring and the condensed ring, wherein the at least two rings are linked by a single bond, —O—, —S—, —C(═O)—, —CH(OH)—, —S(═O)$_2$—, —Si(CH$_3$)$_2$—, —(CH$_2$)$_p$—, —(CF$_2$)$_q$—, —C(C$_n$H$_{2n+1}$)$_2$—, —C(CnF$_{2n+1}$)$_2$—, —(CH$_2$)$_p$—C(C$_n$H$_{2n+1}$)$_2$—(CH$_2$)$_q$—, —(CH$_2$)$_p$—C(CnF$_{2n+1}$)$_2$—(CH$_2$)$_q$— (wherein 1≤n≤10, 1≤p≤10, and 1≤q≤10), —C(CF$_3$)(CH$_5$)—, —C(═O)NH—, or a combination thereof.

In an embodiment, $E^1$ and $E^2$ may each independently be a group including at least two substituted or unsubstituted aromatic single rings linked by a single bond, a substituted or unsubstituted at least two aromatic single rings linked by —O—, —S—, —(CH$_2$)$_p$—, or —(CF$_2$)$_q$— (wherein 1≤p≤10 and 1≤q≤10), or a combination thereof.

In an embodiment, $E^1$ and $E^2$ may each independently be at least two phenylene groups that are respectively substituted with an electron withdrawing group, for example, a haloalkyl group, for example, a trifluoromethyl group, wherein the at least two phenylene groups are linked by a single bond, at least two phenylene groups that are respectively substituted with an alkyl group substituted with a hydroxyl group and a haloalkyl group, for example, a methyl group substituted with a hydroxyl group and a trifluoromethyl group wherein the at least two phenylene groups are linked by an alkylene group, for example, a methylene group, or a combination thereof.

In an embodiment, $E^1$ and $E^2$ may each independently be a group represented by Chemical Formula 7 or Chemical Formula 8:

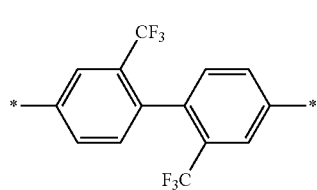
(Chemical Formula 7)

(Chemical Formula 8)

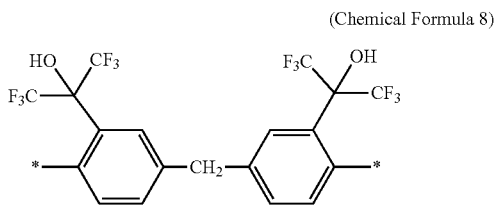

In an embodiment, the copolymer including a polyimide of the optical enhancement layer may include (a) an imide structural unit, and a structural unit consisting of (b) an urethane structural unit, a siloxane structural unit, an amide structural unit, or a combination thereof, in a molar ratio (a:b) of about 30:70 to about 90:10. For example, the molar ratio of the (a) imide structural unit to a structural unit consisting of (b) an urethane structural unit, a siloxane structural unit, an amide structural unit, or a combination thereof may be of about 35:65 to about 85:15, for example, about 40:60 to about 80:20, about 45:55 to about 75:25, about 50:50 to about 70:30, or about 50:50 to about 60:40.

The copolymer including a polyimide including (a) an imide structural unit and a structural unit consisting of (b) an urethane structural unit, a siloxane structural unit, an amide structural unit, or a combination thereof in the above molar ratio may be prepared such that the optical enhancement layer 200 may have a refractive index between the light transmitting substrate 100 and the hard coating layer 300 in the laminated film according to an embodiment.

The optical enhancement layer 200 may further include a partially condensed (incompletely condensed) polyhedral oligomer silsesquioxane (POSS) including a functional group capable of forming a hydrogen bond at the broken site of at least one —Si—O—Si— bond, in addition to the polyimide copolymer including the (a) imide structural unit and the structural unit including (b) an urethane structural unit, a siloxane structural unit, an amide structural unit, or a combination thereof.

In an embodiment, the partially condensed polyhedral oligomer silsesquioxane including a functional group capable of forming a hydrogen bond at the broken site of at least one —Si—O—Si— bond may be represented by Chemical Formula 5 or Chemical Formula 6:

(Chemical Formula 5)

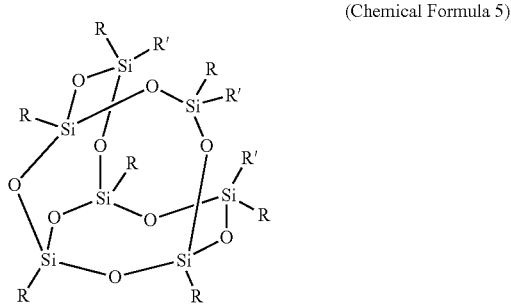

(Chemical Formula 6)

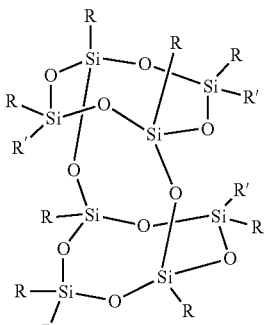

In Chemical Formula 5 and Chemical Formula 6,

R is each independently a substituted or unsubstituted C1 to C30 alkyl group, a substituted or unsubstituted C3 to C30 cycloalkyl group, a substituted or unsubstituted C6 to C30 aryl group, or a combination thereof, and R' is each independently —OH, —SH, or —NH$_2$.

When optical enhancement layer 200 further includes the partially condensed polyhedral oligomer silsesquioxane such as Chemical Formula 5 or Chemical Formula 6 including a functional group capable of forming a hydrogen bond at the broken site of a —Si—O—Si— bond of the partially condensed polyhedral oligomer silsesquioxane, the optical enhancement layer may have increased mechanical strengths of the layer, lowered yellowness, and excellent mechanical properties and optical properties.

The partially condensed polyhedral oligomer silsesquioxane including a functional group capable of forming a hydrogen bond at the broken site of at least one —Si—O—Si— bond may be included in an amount of less than or equal to about 20 parts by mass based on 100 parts by mass of the polyimide copolymer in the optical enhancement layer, for example, less than or equal to about 15 parts by mass based on 100 parts by mass of the polyimide copolymer, less than or equal to about 10 parts by mass based on 100 parts by mass of the polyimide copolymer, or about 1 part by mass to about 10 parts by mass based on 100 parts by mass of the polyimide copolymer in the optical enhancement layer 200.

In an embodiment, R of Chemical Formula 5 and Chemical Formula 6 may each independently be a substituted or unsubstituted C1 to C10 alkyl group, a substituted or unsubstituted C3 to C10 cycloalkyl group, a substituted or unsubstituted C6 to C10 aryl group, or a combination thereof, and R' may each independently be —OH or —NH$_2$.

In an embodiment, R of Chemical Formula 5 and Chemical Formula 6 may each independently be a phenyl group, a C1 to C4 alkyl group, or a combination thereof and R' may be —OH.

In an embodiment, the partially condensed polyhedral oligomer silsesquioxane represented by Chemical Formula 5 and Chemical Formula 6 may be represented by Chemical Formula 5-1 and Chemical Formula 6-1, respectively:

(Chemical Formula 5-1)

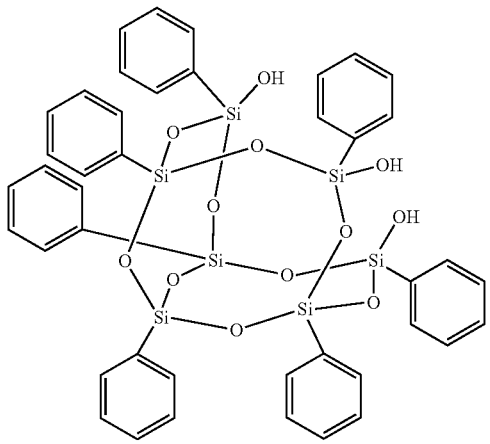

(Chemical Formula 6-1)

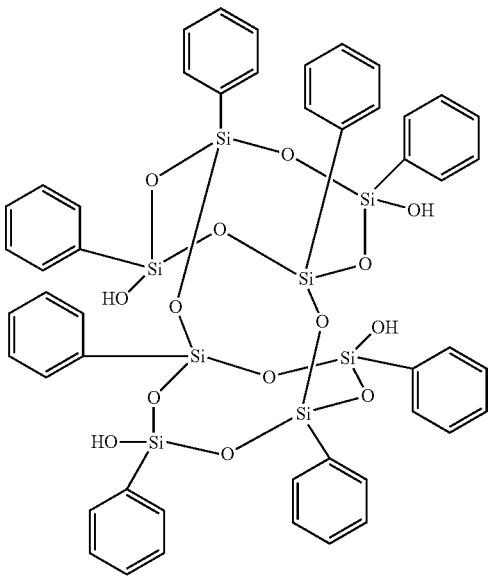

In another embodiment, the optical enhancement layer 200 may further include an additive having a light absorbing function for improving visibility and quality of the laminated film according to an embodiment. As the additive having a light absorbing function, for example, a bluing agent and the like may be included. The bluing agent is an additive that absorbs light in a wavelength region such as orange to yellow in the visible light region and adjusts a color. Examples thereof may include inorganic dyes and pigments such as gamma-ray treated dyes and pigments, cadmium blue and cobalt blue, for example, and organic dyes and pigments such as a phthalocyanine-based bluing agent and a condensed polycyclic bluing agent. The bluing agent is not particularly limited, but a condensed polycyclic bluing agent such as an anthraquinone type bluing agent may be used for heat resistance, light resistance, and solubility considerations. When considering heat resistance, a material having a thermal decomposition temperature of greater than or equal to about 200° C. may be used. Examples of the condensed polycyclic bluing agents include, but are not limited to, an anthraquinone-based bluing agent, an indigo-based bluing agent, a phthalocyanine-based bluing agent, and the like, but are not limited thereto. The bluing agent may appropriately be those used as a bluing agents in a resin material field.

When the optical enhancement layer 200 includes the bluing agent, an amount of the bluing agent may be selected to depending on types of the bluing agent, but for example, may be included in an amount of greater than or equal to about 0.01 parts by mass, for example greater than or equal to about 0.02 parts by mass, or greater than or equal to about 0.03 parts by mass, and less than or equal to about 1.0 part by mass, for example, less than or equal to about 0.5 parts by mass, less than or equal to about 0.2 parts by mass based on 100 parts by mass of the solid of the polyimide copolymer of the optical enhancement layer 200.

A thickness of the optical enhancement layer may be about 0.1 μm to about 10 μm, for example, about 0.1 μm to about 8 μm, about 0.1 μm to about 7 μm, about 0.1 μm to about 5 μm, about 0.3 μm to about 5 μm, about 0.5 μm to about 5 μm, about 0.5 μm to about 3 μm, about 0.5 μm to about 2.5 μm, about 0.5 μm to about 2 μm, about 0.5 μm to about 1.5 μm, or about 1 μm.

The light transmitting substrate 100 of the laminated film according to an embodiment may include a polyimide and/or a poly(imide-amide) copolymer.

A polyimide or a poly(amide-imide) copolymer film is useful for display substrate material due to its high light transmittance, thermal stability, mechanical strength, flexibility, and the like. In this regard, recently there have been attempts to use it as a window film replacing the top-most glass of a mobile device, such as, a smart phone or a tablet PC, and thus a film having much improved mechanical properties and optical properties are desirable. Meanwhile, a refractive index of such a polyimide or a poly(imide-amide) copolymer film is higher than that of a cellulose ester film, for example, a cellulose triacetate film. Accordingly, when a polyimide or poly(imide-amide) copolymer film is used as a light transmitting substrate of a window film, a rainbow phenomenon by interfacial reflection and optical interference may occur due to a refractive index difference with a hard coating layer having a low refractive index which is disposed on the light transmitting substrate to compensate mechanical properties of the light transmitting substrate. In an embodiment, by introducing the optical enhancement layer 200 as described above, a rainbow phenomenon of the laminated film including the light transmitting substrate 100 including polyimide or a poly(imide-amide) copolymer and the hard coating layer 300 applied to strengthen the light transmitting substrate 100 may be substantially reduced or prevented, and thus an optical laminate having improved optical characteristics and color visibility may be provided.

In the laminated film according to an embodiment, a polyimide or a poly(imide-amide) copolymer used for the light transmitting substrate 100 is not particularly limited as long as it has mechanical properties and optical properties that are appropriate for an optical film, for example, a window film. Various types of polyimide or poly(imide-amide) copolymers known in this field may be used without limitation. In an embodiment, the polyimide or poly(imide-amide) copolymer having excellent optical properties and mechanical properties may include a polyimide including an imide structural unit represented by Chemical Formula 1, and/or, a poly(imide-amide) copolymer including an amide structural unit represented by Chemical Formula 4, as well as the imide structural unit:

(Chemical Formula 1)

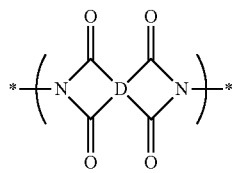

(Chemical Formula 4)

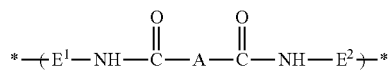

Chemical Formula 1 and Chemical Formula 4 are the same as described above, and thus detailed descriptions thereof will be omitted.

In an embodiment, the imide structural unit represented by Chemical Formula 1 may include an imide structural unit represented by Chemical Formula 1-1, but is not limited thereto:

(Chemical Formula 1-1)

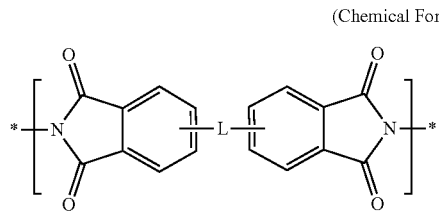

In Chemical Formula 1-1,

L is the same or different and each independently is a single bond, a fluorenylene group, —O—, —S—, —C(=O)—, —CH(OH)—, —S(=O)$_2$—, —Si(CH$_3$)$_2$—, —(CH$_2$)$_p$—, —(CF$_2$)$_q$—, —C(C$_n$H$_{2n+1}$)$_2$—, —C(CnF$_{2n+1}$)$_2$—, —(CH$_2$)$_p$—C(C$_n$H$_{2n+1}$)$_2$—(CH$_2$)$_q$—, —(CH$_2$)$_p$—C(CnF$_{2n+1}$)$_2$—(CH$_2$)$_q$— (wherein 1≤n≤10, 1≤p≤10 and 1≤q≤10), —C(CF$_3$)(C$_6$H$_5$)—, or —C(=O)NH—, and

* is a linking point with an adjacent atom.

In an embodiment, in Chemical Formula 1-1, L may be a combination of a single bond and —C(CF$_3$)$_2$—, but is not limited thereto.

In an embodiment, the amide structural unit represented by Chemical Formula 4 may be an amide structural unit wherein A of Chemical Formula 4 is a substituted or unsubstituted phenylene group, a substituted or unsubstituted biphenylene group, or a combination thereof, and E$^1$ and E$^2$ are each independently a group represented by Chemical Formula 7, a group represented by Chemical Formula 8, or a combination thereof, but is not limited thereto:

(Chemical Formula 7)

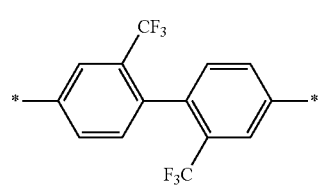

(Chemical Formula 8)

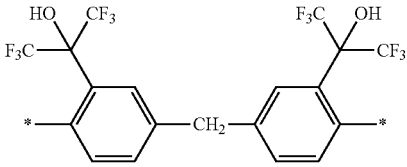

The light transmitting substrate 100 may further include a partially condensed (incompletely condensed) polyhedral oligomer silsesquioxane (POSS) including a functional group capable of forming a hydrogen bond at the broken site of at least one —Si—O—Si— bond, in addition to a polyimide including an imide structural unit, or a poly(imide-amide) copolymer including an imide structural unit and an amide structural unit.

In an embodiment, the partially condensed polyhedral oligomer silsesquioxane including a functional group capable of forming a hydrogen bond at the broken site of at least one —Si—O—Si— bond may be represented by Chemical Formula 5 or Chemical Formula 6:

(Chemical Formula 5)

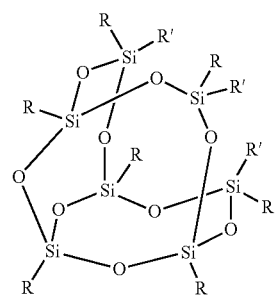

(Chemical Formula 6)

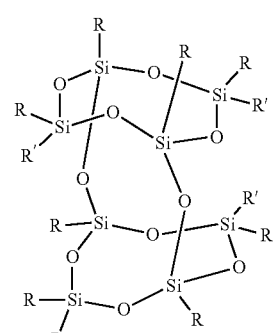

In Chemical Formula 5 and Chemical Formula 6,

R is each independently a substituted or unsubstituted C1 to C30 alkyl group, a substituted or unsubstituted C3 to C30 cycloalkyl group, a substituted or unsubstituted C6 to C30 aryl group, or a combination thereof, and R' is each independently —OH, —SH, or —NH$_2$.

The partially condensed polyhedral oligomer silsesquioxane including a functional group capable of forming a hydrogen bond at the broken site of at least one —Si—O—Si— bond are the same as described above and thus detailed descriptions thereof will be omitted.

The light transmitting substrate 100 including a polyimide or a poly(imide-amide) copolymer may further include the partially condensed polyhedral oligomer silsesquioxane including a functional group capable of forming a hydrogen bond at the broken site of at least one —Si—O—Si— bond, like the optical enhancement layer 200, and thereby mechanical strength and optical properties may be further improved.

The partially condensed polyhedral oligomer silsesquioxane including a functional group capable of forming a hydrogen bond at the broken site of at least one —Si—O—Si— bond may be present in an amount of less than or equal to about 20 parts by mass based on 100 parts by mass of the polyimide or poly(imide-amide) copolymer in the optical enhancement layer, for example, less than or equal to about 15 parts by mass based on 100 parts by mass of the polyimide copolymer, less than or equal to about 10 parts by mass based on 100 parts by mass of the polyimide copolymer, or about 1 part by mass to about parts by mass based on 100 parts by mass of the polyimide or the poly(imide-amide) copolymer in the light transmitting substrate 100.

A thickness of the light transmitting substrate may be about 10 μm to about 300 μm, for example, about 15 μm to about 300 μm, about 20 μm to about 300 μm, about 25 μm to about 300 μm, about 30 μm to about 300 μm, about 30 μm to about 250 μm, about 30 μm to about 200 μm, about 30 μm to about 150 μm, about 30 μm to about 100 μm, about 30 μm to about 80 μm, about 30 μm to about 70 μm, about 30 μm to about 60 μm, about 35 μm to about 60 μm, or about 35 μm to about 55 μm.

The hard coating layer 300 applied to the laminated film according to an embodiment may be any known hard coating layer material in the field and is not particularly limited. The hard coating layer may increase a surface hardness of the laminated film.

As a material of the hard coating layer 300, a material that is cured by heat or light may be used, for example, an acrylate-containing polymer, a urethane-containing polymer, an epoxy-containing polymer, a silicon-containing polymer, polycaprolactone, a urethane-acrylate copolymer, polyrotaxane, a silica-containing inorganic hard coating material, and the like, but is not limited thereto. The acrylate-containing polymer may be a polymer of a monomer mixture including a multi-functional acrylate monomer. Examples of the multi-functional acrylate monomer may be trimethylolpropane triacrylate (TMPTA), trimethylolpropaneethoxy triacrylate (TMPEOTA), propoxylated glycerol triacrylate (GPTA), pentaerythritol tetraacrylate (PETA), and dipentaerythritol hexaacrylate (DPHA), but are not limited thereto. The urethane-containing or acrylate-containing polymer and the polymer of the monomer mixture including the multi-functional acrylate may exhibit excellent adherence and high productivity.

In an embodiment, the hard coating layer may include the silicon-containing polymer, and the silicon-containing polymer may include an organopolysiloxane such as silsesquioxane.

Although in FIGS. 1 and 2, the hard coating layer 300 is a single layer, the hard coating layer is not so limited and may have a multi-layer structure of at least two layers.

A thickness of the hard coating layer 300 may be less than or equal to about 50 μm, for example about 1 μm to about 50 μm, about 1 μm to about 40 μm, about 1 μm to about 30 μm, about 3 μm to about 30 μm, about 5 μm to about 30 μm, about 5 μm to about 25 μm, about 5 μm to about 20 μm, about 5 μm to about 15 μm, or about 5 μm to about 10 μm, but is not limited thereto.

The laminated film according to an embodiment may further include any layer for improving optical properties, mechanical properties, and/or flexural characteristics of the laminated film, in addition to the light transmitting substrate 100, the optical enhancement layer 200, and the hard coating layer 300.

Figure 3:
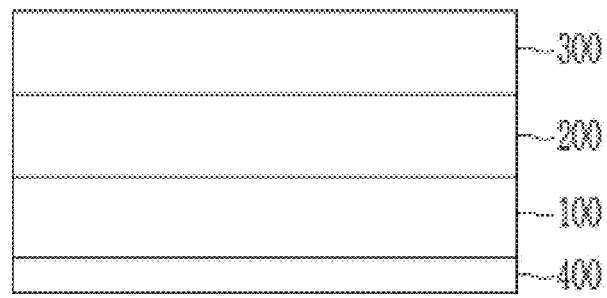
FIG. 3 is a schematic cross-sectional view of a laminated film according to another embodiment which further includes a rear coating layer 400 under the light transmitting substrate 100 of the laminated film of FIG. 1.
Figure 4:
FIG. 4 is a schematic cross-sectional view of a laminated film according to another embodiment which further includes a rear coating layer 400 under the optical enhancement layer 200 of the laminated film of FIG. 2.

For example, as shown in FIGS. 3 and 4, the laminated film according to an embodiment may further include a rear coating layer 400 disposed under the light transmitting substrate 100. In the case of FIG. 3, the rear coating layer 400 is added under the light transmitting substrate 100 of the laminated film of FIG. 1. FIG. 4 shows a rear coating layer 400 disposed under the light transmitting base 100 of the laminated film of FIG. 2. In the laminated film of FIG. 2, the optical enhancement layer 200 exists under the light transmitting substrate 100, and as shown in FIG. 4, the rear coating layer 400 is substantially disposed under the optical enhancement layer 200 that is disposed under the light transmitting substrate 100.

The rear coating layer 400 may include any material as long as it may be optically colorless and transparent, adheres well to an adhesive layer or a superelastic layer that will be described later, and may maintain flexural properties of the laminated film. For example, the rear coating layer 400 may include the same material as the hard coating layer 300, and any material used for a hard coating layer of a conventional window for a display device may be selected without limitation. For example, the rear coating layer 400 may include a (meth)acrylate-containing polymer, polycaprolactone, a urethane-acrylate copolymer, polyrotaxane, an epoxy resin, a siloxane copolymer, perfluoropolyether, or a combination thereof.

A thickness of the rear coating layer 400 may be about 30 nm to about 300 nm, for example, about 40 nm to about 200 nm, about 50 nm to about 180 nm, about 60 nm to about 150 nm, about 70 nm to about 130 nm, about 80 nm to about 120 nm, or about 90 nm to about 120 nm, and may be relatively smaller than the hard coating layer 300.

A refractive index of the rear coating layer may be less than or equal to about 1.7, for example, less than or equal to about 1.6, less than or equal to about 1.5, less than or equal to about 1.4, or less than or equal to about 1.3.

The light transmitting substrate 100, the optical enhancement layer 200, and the hard coating layer 300 are the same as those described with reference to FIGS. 1 and 2, and detailed description thereof will be omitted.

Figure 5:
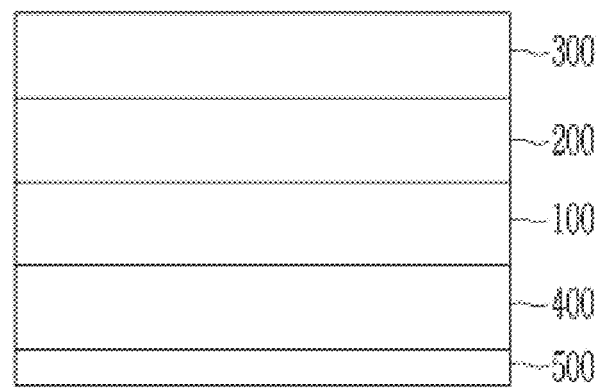
FIG. 5 is a schematic cross-sectional view of a laminated film according to another embodiment which further includes an adhesive or superelastic layer 500 under the rear coating layer 400 of the laminated film of FIG. 3.
Figure 6:
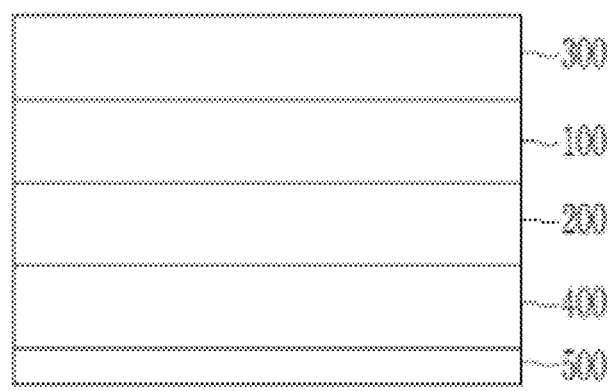
FIG. 6 is a schematic cross-sectional view of a laminated film according to another embodiment which further includes an adhesive or superelastic layer 500 under the rear coating layer 400 of the laminated film of FIG. 4.

As described above, the laminated film may further include an adhesive layer or a superelastic layer 500 under the rear coating layer 400. FIG. 5 is a schematic view of a structure including an adhesive layer or a super-elastic layer 500 under the rear coating layer 400 of the laminated film of FIG. 3, and FIG. 6 is a view of a structure further including an adhesive layer or a superelastic layer 500 under the rear coating layer 400 of the laminated film of FIG. 4.

Meanwhile, the laminated film according to an embodiment may not include the rear coating layer 400, but may include an adhesive layer or a super-elastic layer 500 under the light transmitting substrate 100. This is schematically shown in FIGS. 7 and 8.

Figure 7:
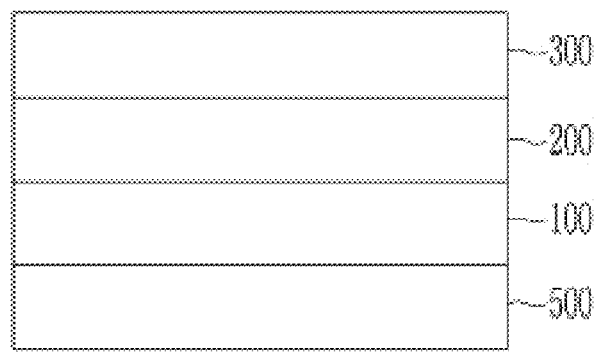
FIG. 7 is a schematic cross-sectional view of a laminated film according to another embodiment which further includes an adhesive or superelastic layer 500 under the light transmitting substrate 100 of the laminated film of FIG. 1.
Figure 8:
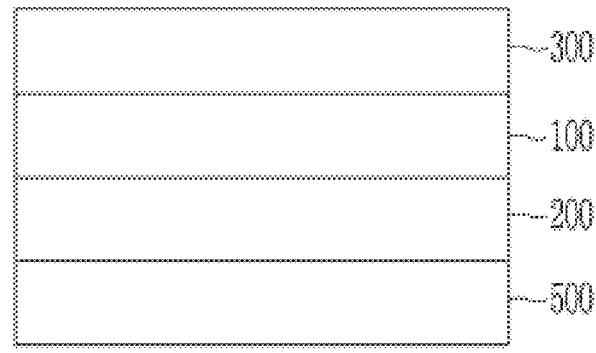
FIG. 8 is a schematic cross-sectional view of a laminated film according to another embodiment which further includes an adhesive or superelastic layer 500 under the optical enhancement layer 200 of the laminated film of FIG. 2.

FIG. 7 is a schematic view of the laminated film further including an adhesive layer or superelastic layer 500 under the light transmitting substrate 100 in the laminated film of FIG. 1, and FIG. 8 is a schematic view of the laminated film including the optical enhancement layer 200 under the light transmitting substrate 100 and further including an adhesive layer or superelastic layer 500 under the optical enhancement layer 200. That is, the laminated film according to one embodiment may further include an adhesive layer or a superelastic layer 500 under the light transmitting substrate 100 with or without the rear coating layer 400. By further including the adhesive layer or the superelastic layer 500, the laminated film may be adhered to a front surface of a display device or to an additional film.

The adhesive layer may include a pressure-sensitive adhesive (PSA), and the superelastic layer may include a superelastic material such as polyurethane, polydimethylsiloxane (PDMS), but they are not limited to.

On the other hand, the adhesive layer or the superelastic layer 500 may cause deterioration of optical characteristics and hardness, so a thin adhesive layer or the superelastic layer 500 may be preferred. For example, the thickness of the adhesive layer or the superelastic layer 500 may be less than or equal to about 50 μm, for example, about 10 μm to about 40 μm, or about 10 μm to about 30 μm, but is not limited thereto.

The light transmitting substrate 100, the optical enhancement layer 200, and the hard coating layer 300, and the rear coating layer 400 are the same as described above, and a detailed description thereof is omitted.

As shown in FIGS. 1 to 8, the laminated films according to embodiments may further include any layer for a desired application, according to the desired characteristics, such as the rear coating layer 400, or the adhesive layer or the superelastic layer 500, and the like, in addition to the light transmitting substrate 100, the optical enhancement layer 200, and the hard coating layer 300, and thus mechanical properties, optical properties, and/or flexural characteristics of the laminated film may be further improved or supplemented. A person skilled in this art may produce the laminated films according to embodiments by selecting, combining, and modifying the above-described layers and layers known in the art in various forms depending on intended uses and functions and the various forms of selection, combination, and modification are also within the scope of the present disclosure.

According to an embodiment, the laminated film including the light transmitting substrate 100, the optical enhancement layer 200, and the hard coating layer 300 may have a light transmittance of greater than or equal to about 90% in an entire wavelength range of about 350 nm to about 750 nm, a yellowness index (YI) of less than about 3, and a haze of less than or equal to about 2. In addition, the laminated film according to an embodiment does not show a rainbow phenomenon on the surface when viewed with a naked eye, and when the reflectance is measured at an incident angle of 45 degrees after attaching the laminated film to a black reflector, the average amplitude in the visible region is less than or equal to about 0.1%, which indicates that the rainbow phenomenon is suppressed.

That is, in the laminated film including the light transmitting substrate 100 and the hard coating layer 300 having different refractive indexes, the laminated film may have excellent optical properties and may suppress the rainbow phenomenon on the surface and thus improve appearance quality, by including the optical enhancement layer including a polyimide-based copolymer having a refractive index between the refractive index values of the two layers between the light transmitting substrate 100 and the hard coating layer 300 or at a position facing the hard coating layer 300 with the light transmitting substrate 100 therebetween.

The laminated film according to an embodiment may be manufactured by producing a film including a polyimide or a poly(imide-amide) copolymer as the light transmitting substrate 100, applying a coating of a solution of a polyimide-containing copolymer for forming the optical enhancement layer 200 on one surface of the light transmitting substrate 100, removing a solvent from the coated product to form the optical enhancement layer 200, subsequently, applying a coating a hard coating solution for forming the hard coating layer 300 on the surface of the optical enhancement layer 200 or on the other surface of the light transmitting substrate 100 opposed to the surface on which the optical enhancement layer 200 is disposed, and removing the solvent from the hard coating solution to form the hard coating layer 300.

The film including the polyimide or poly(imide-amide) copolymer as the light transmitting substrate 100 may be easily produced by preparing the polyimide and/or poly (imide-amide) copolymer using a method of preparing the polyimide and/or poly(imide-amide) copolymer known in this art, and then making a film therefrom, or may be a commercially available polyimide or poly(imide-amide) copolymer film.

The imide structural unit of the polyimide or poly(imide-amide) copolymer may be prepared by a polymerization reaction of diamine and dianhydride or a diisocyanate compound in an organic solvent. The diamine, dianhydride, and diisocyanate are not limited to specific compounds, and any diamine, dianhydride, and diisocyanate compound can be appropriately selected and used as long as they may provide polyimide or a poly(imide-amide) copolymer satisfying optical properties and mechanical properties suitable for use as the light transmitting substrate 100 of the laminated film according to an embodiment. Examples of the diamine compound may be hexamethylene diamine; m-phenylene diamine; p-phenylene diamine; 1,3-bis(4-aminophenyl) propane; 2,2-bis(4-aminophenyl) propane; 4,4'-diamino-diphenyl methane; 1,2-bis(4-aminophenyl) ethane; 1,1-bis(4-aminophenyl) ethane; 2,2'-diamino-diethyl sulfide; bis(4-aminophenyl) sulfide; 2,4'-diamino-diphenyl sulfide; bis(3-aminophenyl) sulfone; bis(4-aminophenyl) sulfone; 4,4'-diamino-dibenzyl sulfoxide; bis(4-aminophenyl) ether; bis (3-aminophenyl) ether; bis(4-aminophenyl)diethyl silane; bis(4-aminophenyl) diphenyl silane; bis(4-aminophenyl) ethyl phosphineoxide; bis(4-aminophenyl) phenyl phosphineoxide; bis(4-aminophenyl)-N-phenyl amine; bis(4-aminophenyl)-N-methylamine; 1,2-diamino-naphthalene; 1,4-diamino-naphthalene; 1,5-diamino-naphthalene; 1,6-diamino-naphthalene; 1,7-diamino-naphthalene; 1,8-diamino-naphthalene; 2,3-diamino-naphthalene; 2,6-diamino-naphthalene; 1,4-diamino-2-methyl-naphthalene; 1,5-diamino-2-methyl-naphthalene; 1,3-diamino-2-phenyl-naphthalene; 4,4'-diamino-biphenyl; 3,3'-diamino-biphenyl; 3,3'-dichloro-4,4'-diamino-biphenyl; 3,3'-dimethyl-4,4'-diamino-biphenyl; 3,3'-dimethyl-4,4'-diamino-biphenyl; 3,3'-dimethoxy-4,4'-diamino-biphenyl; 4,4'-bis(4-aminophenoxy)-biphenyl; 2,4-diamino-toluene; 2,5-diamino-toluene; 2,6-diamino-toluene; 3,5-diamino-toluene; 1,3-diamino-2, 5-dichloro-benzene; 1,4-diamino-2,5-dichloro-benzene; 1-methoxy-2,4-diamino-benzene; 1,4-diamino-2-methoxy-5-methyl-benzene; 1,4-diamino-2,3,5,6-tetramethyl-benzene; 1,4-bis(2-methyl-4-amino-pentyl)-benzene; 1,4-bis(1, 1-dimethyl-5-amino-pentyl)-benzene; 1,4-bis(4-aminophenoxy)-benzene; o-xylene diamine; m-xylene diamine; p-xylene diamine; 3,3'-diamino-benzophenone; 4,4'-diamino-benzophenone; 2,6-diamino-pyridine; 3,5-diamino-pyridine; 1,3-diamino-adamantane; bis[2-(3-aminophenyl)hexafluoroisopropyl] diphenyl ether; 3,3'-diamino-1, 1,1'-diadamantane; N-(3-aminophenyl)-4-aminobenzamide; 4-aminophenyl-3-aminobenzoate; 2,2-bis(4-aminophenyl) hexafluoropropane; 2,2-bis(3-aminophenyl) hexafluoropropane; 2-(3-aminophenyl)-2-(4-aminophenyl)hexafluoropropane; 2,2-bis[4-(4-aminophenoxy)phenyl]hexafluoropropane; 2,2-bis[4-(2-chloro-4-aminophenoxy)phenyl hexafluoropropane; 1,1-bis(4-aminophenyl)-1-phenyl-2,2,2-trifluoroethane; 1,1-bis[4-(4-aminophenoxy)phenyl]-1-phenyl-2,2,2-trifluoroethane; 1,4-bis(3-aminophenyl)buta-1-ene-3-yn; 1,3-bis(3-aminophenyl) hexafluoropropane; 1,5-bis(3-aminophenyl) decafluoropentane; and 4,4'-bis[2-(4-aminophenoxyphenyl) hexafluoroisopropyl] diphenyl ether, diaminocyclohexane, bicyclohexyldiamine, 4,4'-diaminocyclohexylmethane, diaminofluorene, and the like, but are not limited thereto. Such diamine compounds may be commercially available or may be synthesized by known methods.

For example, the diamine may be compounds with the following structural formulae:

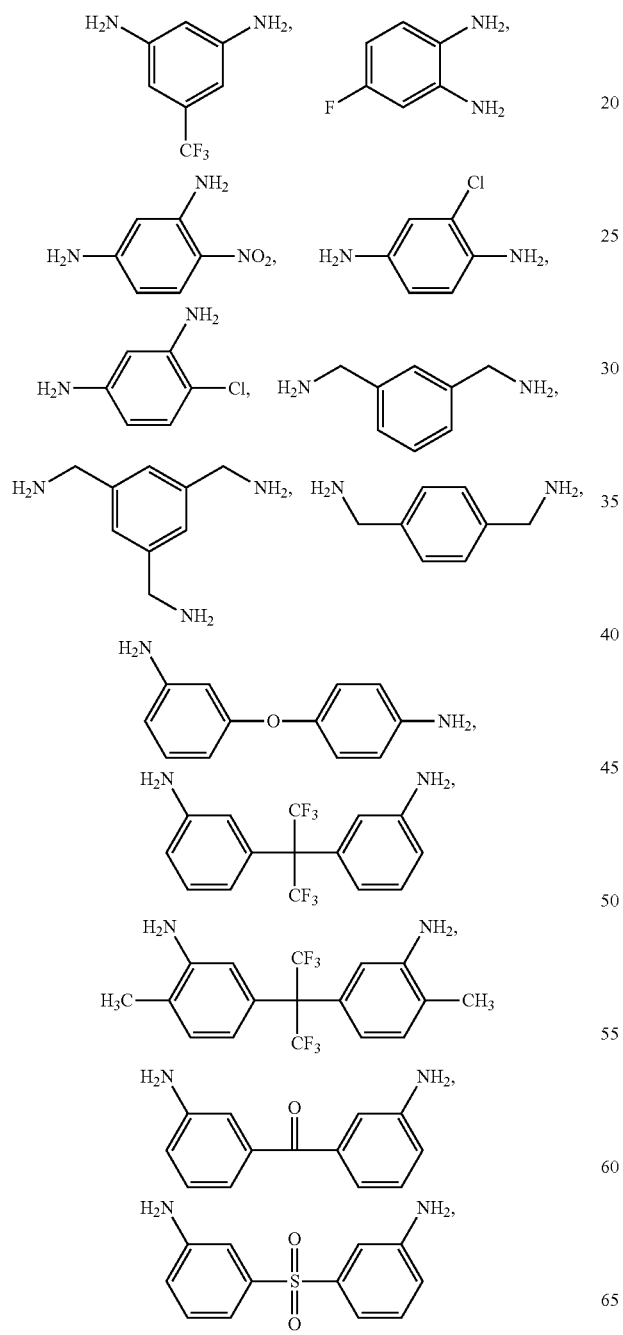

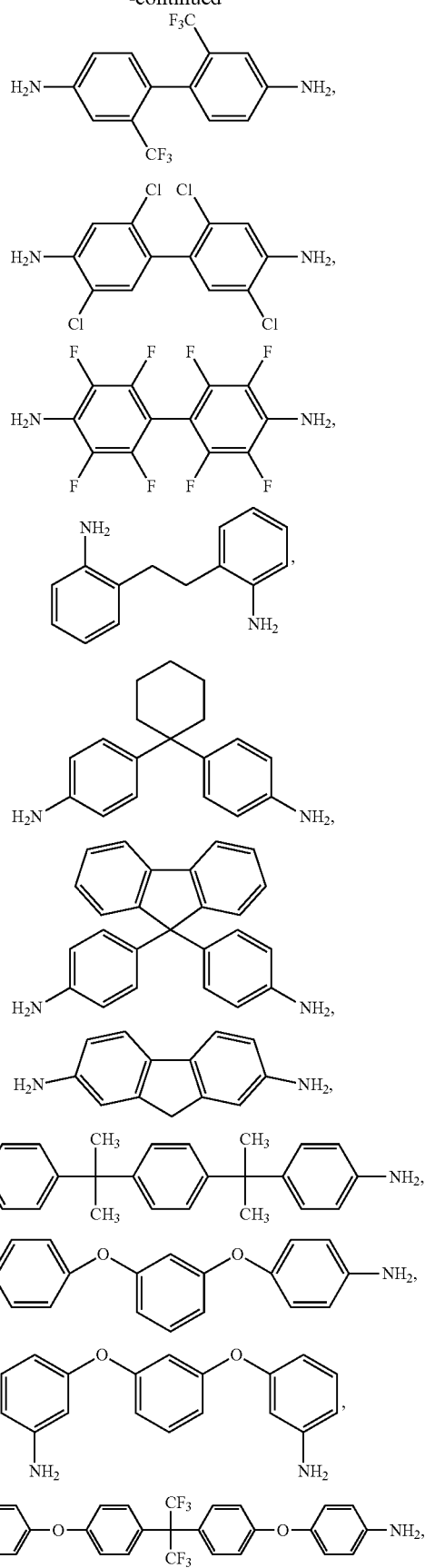

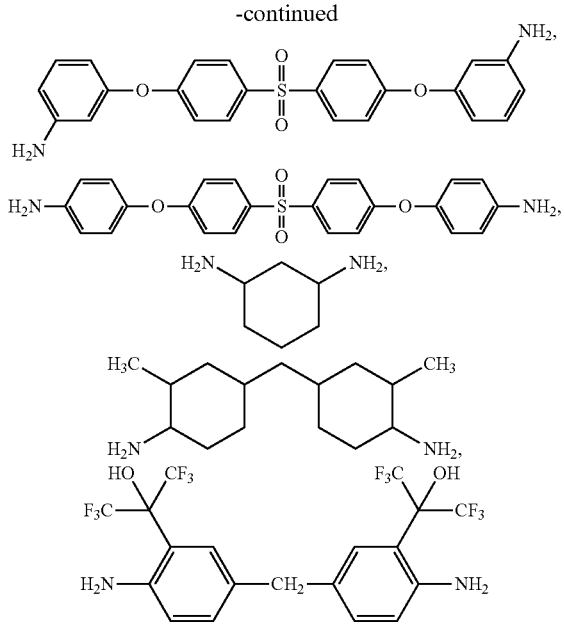

In an embodiment, the diamine may be 2,2'-bis(trifluoromethyl) benzidine (TFDB) and/or 3,3'-bis(1-hydroxy-1-trifluoromethyl-2,2,2-trifluoroethyl)-4,4'-methylenedianiline (MFA-MDA).

The dianhydride may be a tetracarboxylic dianhydride 3,3',4,4'-biphenyl tetracarboxylic dianhydride (BPDA), bicyclo[2.2.2]oct-7-ene-2,3,5,6-tetracarboxylic dianhydride (BTDA), 3,3',4,4'-diphenylsulfone tetracarboxylic dianhydride (DSDA), 4,4'-(hexafluoroisopropylidene)diphthalic anhydride (6FDA), 4,4'-oxydiphthalic anhydride (ODPA), pyromellitic dianhydride (PMDA), 4-(2,5-dioxotetrahydrofuran-3-yl)-1,2,3,4-tetrahydronaphthalene-1,2-dicarboxylic anhydride (DTDA), 1,2,4,5-benzene tetracarboxylic dianhydride; 1,2,3,4-benzene tetracarboxylic dianhydride; 1,4-bis (2,3-dicarboxyphenoxy) benzene dianhydride; 1,3-bis(3,4-dicarboxyphenoxy) benzene dianhydride; 1,2,4,5-naphthalene tetracarboxylic dianhydride; 1,2,5,6-naphthalene tetracarboxylic dianhydride; 1,4,5,8-naphthalene tetracarboxylic dianhydride; 2,3,6,7-naphthalene tetracarboxylic dianhydride; 2,6-dichloronaphthalene-1,4,5,8-tetracarboxylic dianhydride; 2,7-dichloronaphthalene-1,4,5,8-tetracarboxylic dianhydride; 2,3,6,7-tetrachloronaphthalene-1,4,5,8-tetracarboxylic dianhydride; 3,3',4,4'-biphenyl tetracarboxylic dianhydride; 2,2',3,3'-biphenyl tetracarboxylic dianhydride; 4,4'-bis(3,4-dicarboxyphenoxy)diphenyl dianhydride; bis(2,3-dicarboxylphenyl) ether dianhydride; 4,4'-bis(2,3-dicarboxyphenoxy) diphenylether dianhydride; 4,4'-bis(3,4-dicarboxyphenoxy) diphenylether dianhydride; bis(3,4-dicarboxylphenyl) sulfide dianhydride; 4,4'-bis(2,3-dicarboxyphenoxy) diphenylsulfide dianhydride; 4,4'-bis(3,4-dicarboxyphenoxy) diphenyl sulfide dianhydride; bis(3,4-dicarboxylphenyl) sulfone dianhydride; 4,4'-bis(2,3-dicarboxyphenoxy) diphenylsulfone dianhydride; 4,4'-bis(3,4-dicarboxyphenoxy) diphenylsulfone dianhydride; 3,3',4,4''-benzophenone tetracarboxylic acid dianhydride; 2,2',3,3'-benzophenone tetracarboxylic acid dianhydride; 2,3,3'4'-benzophenone tetracarboxylic acid dianhydride; 4,4'-bis(3,4-dicarboxyphenoxy) benzophenone dianhydride; bis(2,3-dicarboxylphenyl) m ethane dianhydride; bis(3,4-dicarboxylphenyl) methane dianhydride; 1,1-bis(2,3-dicarboxylphenyl) ethane dianhydride; 1,1-bis(3,4-dicarboxylphenyl) ethane dianhydride; 1,2-bis(3,4-dicarboxylphenyl) ethane dianhydride; 2,2-bis(2,3-dicarboxylphenyl) propane dianhydride; 2,2-bis(3,4-dicarboxylphenyl) propane dianhydride; 2,2-bis[4-(2,3-dicarboxylphenoxy) phenyl] propane dianhydride; 2,2-bis [4-(3,4-dicarboxylphenoxy) phenyl]propane dianhydride; 4-(2,3-dicarboxylphenoxy)-4'-(3,4-dicarboxylphenoxy) diphenyl-2,2-propane dianhydride; 2,2-bis[4-(3,4-dicarboxylphenoxy-3,5-dimethyl)phenyl] propane dianhydride; 2,3,4,5-thiophene tetracarboxylic dianhydride; 2,3,5,6-pyrazine tetracarboxylic dianhydride; 1,8,9,10-phenanthrene tetracarboxylic dianhydride; 3,4,9,10-perylene tetracarboxylic dianhydride; 2,2-bis(3,4-dicarboxylphenyl) hexafluoropropane dianhydride; 1,3-bis(3,4-dicarboxylphenyl) hexafluoropropane dianhydride; 1,1-bis(3,4-dicarboxylphenyl)-1-phenyl-2,2,2-trifluoroethane dianhydride; 2,2-bis[4-(3,4-dicarboxylphenoxy) phenyl] hexafluoropropane dianhydride; 1,1-bis [4-(3,4-dicarboxylphenoxy) phenyl]-1-phenyl-2,2,2-trifluoro ethane dianhydride; and 4,4'-bis[2-(3,4-dicarboxylphenyl)hexafluoroisopropyl] diphenyl ether dianhydride, or a combination thereof, but are not limited thereto. Such dianhydride compounds may be commercially available or may be synthesized by known methods.

In an embodiment, the tetracarboxylic dianhydride may include 3,3',4,4'-biphenyl tetracarboxylic dianhydride (BPDA), 4,4'-(hexafluoroisopropylidene)diphthalic anhydride (6FDA), or a combination thereof.

On the other hand, known methods for producing polyamides include a low-temperature solution polymerization method, an interfacial polymerization method, a melt polymerization method, a solid-phase polymerization method, and the like. Among them, for example, in the low-temperature solution polymerization method, carboxylic acid dihalide and diamine may be reacted to form the amide structural unit represented by Chemical Formula 4.

The carboxylic dihalide may be terephthaloyl chloride (TPCI), isophthaloyl chloride (IPCI), biphenyl dicarbonylchloride (BPCI), naphthalene dicarbonylchloride, terphenyl dicarbonylchloride, 2-fluoro-terephthaloyl chloride, adipoyl chloride, sebacoyl chloride, and the like, but is not limited thereto.

In an embodiment, the carboxylic dihalide may be terephthaloyl chloride (TPCI).

The diamine for forming the amide structure may be the same diamine compound as the diamine that is used for forming the imide structure. That is, the amide structure may be formed using at least one of the same or different diamines used for forming the imide structure.

In an embodiment, the diamine for forming the amide structure along with the carboxylic dihalide may be 2,2'-bis(trifluoromethyl)benzidine (TFDB) and/or 3,3'-bis(1-hydroxy-1-trifluoromethyl-2,2,2-trifluoroethyl)-4,4'-methylenedianiline (MFA-MDA).

The aprotic polar solvent may be, for example, a sulfoxide containing solvent such as dimethylsulfoxide, diethylsulfoxide, and the like, a formamide containing solvent such as N,N-dimethyl formamide, N,N-diethylformamide, and the like, an acetamide containing solvent such as N,N-dimethyl acetamide, N,N-diethylacetamide, and the like, a pyrrolidone containing solvent such as N-methyl-2-pyrrolidone, N-vinyl-2-pyrrolidone, and the like, a phenol containing solvent such as phenol, o-, m- or p-cresol, xylenol, a halogenated phenol, catechol, and the like, or hexamethyl phosphoramide, γ-butyrolactone, wherein each aprotic polar solvent may be used alone or in a mixture thereof. However, the aprotic polar solvent is not limited thereto and an aromatic hydrocarbon such as xylene and toluene may be used.

The amide structural unit and the imide structural unit may be prepared by firstly reacting a diamine and a dicarboxylic dihalide for forming an amide structural unit, and then adding to the same reactor a dianhydride with or without the further addition of a diamine for forming an imide structural unit, and thereby a poly(amide-amic acid) copolymer may be prepared.

Alternatively, an amide oligomer having two terminal ends both of which are terminated with an amino group may be firstly prepared by reacting a diamine and a dicarboxylic dihalide for forming an amide structural unit, and then the amide oligomer as a diamine monomer may be added to and reacted with a dianhydride to form a poly(amide-amic acid) copolymer. According to the latter method, a precipitation process for removal of hydrogen chloride (HCl) generated in the amide forming process may be omitted, a processing time may be shortened, and a yield of the poly(amide-imide) copolymer as a final product may be increased.

The amic acid moiety of the polyamic acid or the poly(amic acid-amide) copolymer prepared as described above may undergo a dehydration ring closure reaction to produce a polyimide or poly(imide-amide) copolymer. A solution including such a polyimide or polyimide-amide copolymer may be cast on a substrate by a known method, followed by drying and curing the solution by heating or the like to produce an article such as a film.

The polyimide-based copolymer solution for forming the optical enhancement layer 200 is coated on the surface of the film including the polyimide or poly(imide-amide) copolymer prepared as described above. The method for producing such a polyimide copolymer solution is substantially the same as the method for producing a polyimide or poly(imide-amide) copolymer solution for producing the aforementioned light transmitting substrate 100.

For example, when the optical enhancement layer 200 includes a poly(imide-urethane) copolymer including an imide structural unit and an urethane structural unit, a diol and a diisocyanate compound are firstly polymerized as monomers for preparing a urethane structural unit, then a tetracarboxylic dianhydride and a diamine for forming an imide structural unit are added to the reactor and polymerized, whereby a solution of a poly(imide-urethane) copolymer including both imide structural unit and urethane structural unit may be prepared. The reaction between the diol and the diisocyanate compound to form the urethane structural unit is also well known in this art. There are no particular limitations for the diol and diisocyanate compound, and any type of diisocyanate compound may be used as long as the diisocyanate compound does not significantly adversely affect the optical properties and mechanical properties suitable for use as the optical enhancement layer 200 in the laminated film according to an embodiment. Such diol and diisocyanate compounds may be synthesized by methods known in this art, or may be commercially available.

When the optical enhancement layer 200 includes an imide structural unit and a siloxane structural unit, tetracarboxylic dianhydride and diamine for forming the imide structural unit may be mixed and reacted in an organic solvent, and a siloxane compound including amino groups at both terminal ends may also be added to the reactor to react as a diamine component to easily prepare a poly(imide-siloxane) copolymer solution. The siloxane compound including amino groups at both terminal ends is polymerized with the tetracarboxylic dianhydride to form an imide structural unit, and thus is polymerized with an imide structural unit prepared by a reaction between a diamine compound including no siloxane and a tetracarboxylic dianhydride to prepare the poly(imide-siloxane) copolymer. The siloxane compounds including amino groups at both terminal ends may be easily synthesized by methods well known to a person skilled in this art, or obtained commercially. A person skilled in the art may select the siloxane compound modified with amino groups at both terminal ends based on the desired mechanical properties and optical properties. For example, the siloxane compound may be represented by Chemical Formula 3-1:

(Chemical Formula 3-1)

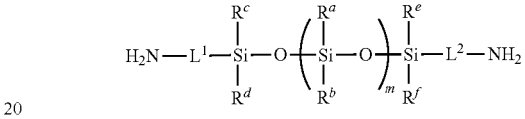

In Chemical Formula 3-1, $R^a$ to $R^f$, $L^1$, $L^2$, and m are the same as defined in Chemical Formula 3.

When the optical enhancement layer 200 includes a poly(imide-amide) copolymer including an imide structural unit and an amide structural unit, it is the same as in the light transmitting substrate 100 including the poly(imide-amide) copolymer and thus detailed description thereof will be omitted.

The solutions of the poly(imide-urethane) copolymer, the poly(imide-siloxane) copolymer, or the poly(imide-amide) copolymer prepared as described above may be further diluted with a solvent or the like, and may be coated on the film surface of the light transmitting substrate 100 including the poly(amide-imide) copolymer and dried, whereby an optical enhancement layer 200 of the laminated film according to an embodiment may be easily formed.

The method of preparing the solution for forming the hard coat layer 300 is not particularly limited, and the solution may be provided by preparing a polymer solution that may be used as a hard coating material, using a method well known to those skilled in the art or by using commercially available materials. For example, when the hard coat layer 300 includes a siloxane-containing polymer, a silane compound is subjected to a polycondensation reaction in a solvent to prepare a polysiloxane, and a solution including the polysiloxane obtained therefrom may be used as a hard coating solution. Alternatively, when the hard coat layer 300 includes an acrylate-containing polymer, a commercially available acrylate polymer may be dissolved in an appropriate solvent, or acrylate monomers may be polymerized to prepare an acrylate-containing polymer solution. All of these methods are well known to a person skilled in this art, so a detailed description thereof is omitted.

The laminated film includes light transmitting substrate 100 including the polyimide or poly(imide-amide) copolymer prepared by the above method, optical enhancement layer 200 disposed on one surface of the light transmitting substrate 100, and hard coating layer 300 disposed on the optical enhancement layer 200, or disposed on the other surface of the light transmitting substrate 100 opposed to the surface on which the optical enhancement layer 200 is disposed, such that the hard coating layer may be disposed facing the optical enhancement layer 200 with the light transmitting substrate 100 therebetween, wherein the optical enhancement layer 200 includes a copolymer including a polyimide and the refractive index of the optical enhancement layer 200 is between the refractive index of the light transmitting substrate 100 and the refractive index of the hard coating layer 300 may suppress generation of interfacial reflection and optical interference fringes due to a refractive index difference between the layers, and thereby optical characteristics, color visibility, and appearance quality may be improved. Accordingly, such a laminated film may be advantageously used for a window film of a display device.

Hereinafter, the embodiments will be described in more detail by examples and comparative examples. The following examples and comparative examples are for illustrative purposes and the scope of the present disclosure is not limited thereto.

EXAMPLES

Synthesis Example 1: Preparation of Amide Structural Unit-Containing Oligomer

According to Reaction Scheme 1, an amide structural unit-containing oligomer which forms an aramid structure having amino groups at both ends by polymerizing TFDB (2,2'-bis(trifluoromethyl)benzidine) and TPCL (terephthaloyl chloride) is prepared.

(Reaction Scheme 1)

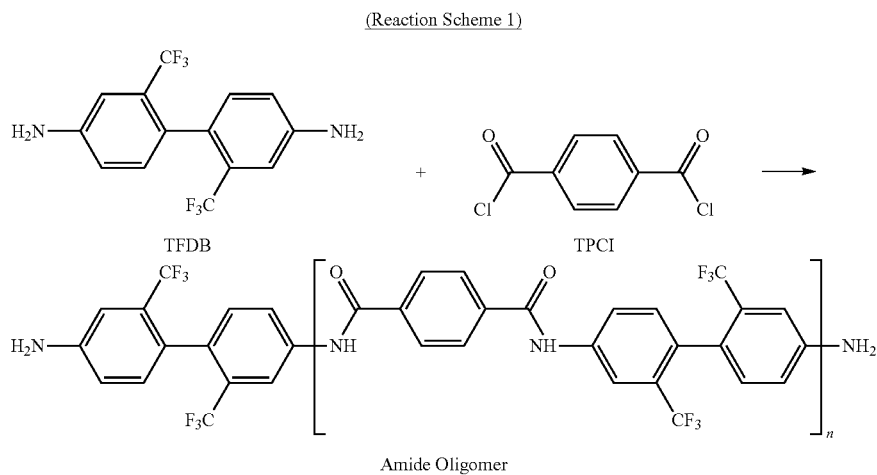

Amide Oligomer

Particularly, 1 molar equivalent (0.122 mol, 39.2 g) of 2,2'-bis(trifluoromethyl)benzidine (TFDB) and 2.8 molar equivalent (0.343 mol, 27.11 g) of pyridine were dissolved in 700 g of N,N-dimethylacetamide (DMAC) in a round-bottom flask, and then the residual TFDB was completely dissolved by further adding 50 ml of dimethyl acetamide. 0.7 molar equivalent (0.086 mol, 17.4 g) of terephthaloyl chloride (TPCl) was added in four portions and vigorously stirred for 15 minutes.

The resultant solution is stirred under the nitrogen atmosphere for 2 hours, and then added into 7 L of a NaCl solution containing 350 g of NaCl and stirred for 10 minutes. The solid is filtered and re-suspended with 5 L of deionized water and re-filtered twice more. Subsequently, the remained water is removed as much as possible by appropriately pressing the final filter cake on the filter and dried under a vacuum at 90° C. for 48 hours to provide an amide structural unit-containing oligomer indicated as "amide oligomer" in Reaction Scheme 1. The number average molecular weight of the obtained oligomer is about 1,400 gram/mole.

Preparation Examples 1 to 4: Preparation of Polyimide-based Copolymer Solution for Optical Enhancement Layer Preparation Example 1: Preparation of Poly(imide-urethane) Copolymer Solution 2.52 g (0.0279 mol) of butanediol (BD) and 12.4 g (0.0559 mol) of isophorone diisocyanate (IPDI), and DBTDL (dibutyltin dilaurate) are added into 250 ml of 4-neck double wall reactor equipped with a mechanical agitator and a nitrogen inlet, the temperature is slowly increased to 70° C., and the reaction mixture is stirred at 70° C. for 4 hours to be reacted. After completing the reaction, the reactor is cooled to 25° C., and 94 g of dimethyl acetamide (DMAc), 8.95 g (0.0279 mol) of 2,2'-bis(trifluoromethyl)benzidine (TFDB), 2.46 g (0.0084 mol) of 3,3',4,4'-biphenyltetracarboxylic dianhydride (BPDA), and 8.70 g (0.0196 mol) of 2,2-bis-(3,4-dicarboxyphenyl hexafluoropropane dianhydride) (6FDA) are added and stirred for 24 hours. Then, 2.3 g of pyridine and 7.9 g of acetic anhydride are added and stirred for 24 hours to provide a poly(imide-urethane) copolymer solution having a solid content of 25 wt %.

Preparation Example 2: Preparation of Poly(imide-siloxane) Copolymer Solution 58 g of dimethyl acetamide (DMAc) is added into 250 ml 4-neck double wall reactor equipped with a mechanical agitator and a nitrogen inlet, and the temperature is set at 25° C., and 5.7 g (0.018 mol) of 2,2'-bis(trifluoromethyl)benzidine (TFDB) is added and dissolved, and then solution is maintained at 25° C. 3.9 g (0.0045 mol) of polydimethylsiloxane (DMS-A11, Gelest) capped with aminopropyl groups at the both ends thereof is dissolved in 26 g of tetrahydrofuran (THF) and then added to the reactor. Then, 1.97 g (0.0067 mol) of 3,3',4,4'-biphenyltetracarboxylic dianhydride (BPDA) and 6.94 g (0.0156 mol) of 2,2-bis-(3,4-dicarboxyphenyl)hexafluoropropane dianhydride (6FDA)

are added to the solution and stirred for 48 hours, and then 1.8 g of pyridine and 6.8 g of acetic anhydride are added and stirred for 24 hours to provide a poly(imide-siloxane) copolymer solution having a solid content of 17 wt %.

Preparation Example 3: Preparation of Poly(imide-amide-siloxane) Copolymer Solution 120 g of dimethyl acetamide (DMAc) is added into a 250 ml 4-neck double wall reactor equipped with a mechanical agitator and a nitrogen inlet, the temperature is set at 25° C., and 21.36 g (0.015 mol) of the amide structural unit-containing oligomer obtained from Synthesis Example 1, 0.37 g (0.0011 mol) of 2,2'-bis(trifluoromethyl)benzidine (TFDB), and 0.673 g (0.0027 mol) of 1,3-bis (3-aminopropyl)-tetramethyldisiloxane (DSX) are added and dissolved, and the solution is maintained at 25° C. 1.59 g (0.0054 mol) of 3,3',4,4'-biphenyltetracarboxylic dianhydride (BPDA) and 6 g (0.013 mol) of 2,2-bis-(3,4-dicarboxyphenyl) hexafluoropropane dianhydride (6FDA) are added into the solution and stirred for 48 hours. Then, 1.5 g of pyridine and 5.83 g of acetic anhydride are added to the solution, and stirred for 24 hours to provide a poly(imide-amide-siloxane) copolymer solution having a solid content of 20 wt %.

Preparation Example 4: Preparation of Poly(imide-amide) Copolymer Solution 120 g of dimethyl acetamide (DMAc) is added to a 250 ml 4-neck double wall reactor equipped with a mechanical agitator and a nitrogen inlet, the temperature is set at 25° C., and 21.36 g (0.015 mol) of amide structural unit-containing oligomer obtained from Synthesis Example 1, 0.37 g (0.0011 mol) of 2,2'-bis(trifluoromethyl)benzidine (TFDB), and 8.87 g (0.0167 mol) of 3,3'-Bis (1-hydroxy-1-trifluoromethyl-2,2,2-trifluoroethyl)-4,4'-methylenedianiline (MFA-MDA) are dissolved, and the solution is maintained at 25° C. 1.23 g (0.0042 mol) of 3,3',4,4'-biphenyltetracarboxylic dianhydride (BPDA) and 9.28 g (0.021 mol) of 2,2-bis-(3,4-dicarboxyphenyl)hexafluoropropane dianhydride (6FDA) are added into the solution and stirred for 48 hours. Then, 1.98 g of pyridine and 7.68 g of acetic anhydride are added to the solution and stirred for 24 hours to provide a poly(imide-amide) copolymer solution having a solid content of 20 wt %.

Preparation Example 5: Preparation of Solution for Forming Hard Coating Layer

Preparation Example 5-1: Preparation of Silsesquioxane 20 mL of ethanol (Samchun Chemicals) and 17.5 g of 1 wt %-diluted tetramethylammonium hydroxide solution (TMAH: Sigma-Aldrich) are added to a 100 mL double jacket reaction bath and mixed. 26.5 mL of (3-glycidyloxypropyl)trimethoxysilane (Sigma-Aldrich) is added while mixing them and mixed at a room temperature for 6 hours. Subsequently, the temperature is increased up to 60° C., and 40 mL toluene (Sigma-Aldrich) is added to the mixture and reacted for 6 hours. Upon completion of the reaction, the reaction product solution is washed by using a saturated sodium chloride solution (Samchun Chemicals), and the remaining moisture is removed by using anhydrous sodium sulfate (Samchun Chemicals). Subsequently, solvent was removed by using an evaporator (Daihan Scientific Co., Ltd.) and a vacuum oven (Daihan Scientific Co., Ltd.).

Preparation Example 5-2: Preparation of Silsesquioxane 20 mL of ethanol (Samchun Chemicals) and 17.5 g of 1 wt %-diluted tetramethylammonium hydroxide (TMAH, Sigma-Aldrich) solution are added into 100 mL double jacket reaction bath and mixed. While mixing them, 18.2 mL of [8-(Glycidyloxy)-n-octyl]trimethoxysilane (TCI) is added thereto and mixed at room temperature for 6 hours. Subsequently, the temperature is increased up to 60° C., and 40 mL of toluene (Sigma-Aldrich) is added to the mixture and mixed for 6 hours. When completing the mixing, the reaction product solution is washed by using a saturated sodium chloride solution (Samchun Chemicals), and the remaining moisture is removed by using anhydrous sodium sulfate (Samchun Chemicals). The solvent was removed by using an evaporator (Daihan Scientific Co., Ltd.) and a vacuum oven (Daihan Scientific Co., Ltd.).

Preparation Example 5-3: Preparation of Hard Coating Solution

Silsesquioxane obtained from Preparation Example 5-1, silsesquioxane obtained from Preparation Example 5-2, and a cation polymerizable organic compound represented by the following Chemical Formula A are added to methyl isobutyl ketone at a weight ratio of 40:40:20, respectively, and stirred. Herein, the amount (solid content) of silsesquioxane obtained from Preparation Example 5-1, silsesquioxane obtained from Preparation Example 5-2, and a cation polymerizable organic compound represented by the following Chemical Formula A is 50% based on the total weight of the solution. A cation initiator of Irgacure 250 (BASF) is added thereto in 2 parts by weight based on 100 parts by weight of the solid, and a surface characteristic controlling agent of KY-1203 (Shin-Etsu) is added thereto in 0.1 parts by weight based on 100 parts by weight of the solid and uniformly mixed to provide a hard coating layer-forming solution.

(Chemical Formula A)

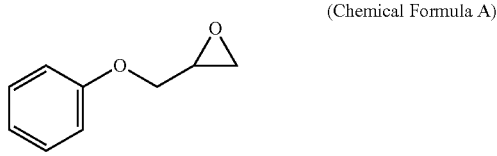 [SMILES: c1ccc(OCC2CO2)cc1]

A refractive index of the hard coating layer made from the hard coating layer-forming solution prepared according to Preparation Example 5-3 is 1.5. The refractive index is measured by being set to the Gen-Osc model in a visible region with an Ellipsometer (M-2000, J. A. Woollam), and the value at a wavelength of 550 nm is measured.

Preparation Example 6: Preparation of Light Transmitting Substrate Film 101.86 ml of dimethyl acetamide (DMAc) is added into 250 ml 4-neck double wall reactor equipped with a mechanical agitator and a nitrogen inlet, which is preheated at 30° C., and 12.6 g (0.0155 mol) of amide structural unit-containing oligomer obtained from Synthesis Example 1 is added thereto. Until the oligomer is completely dissolved, the solution is stirred under a nitrogen atmosphere at 30° C. Then 4.1309 g (0.0093 mol) of 6FDA and 1.8239 g (0.0062 mol) of BPDA are slowly added thereto. 10 ml of DMAc is further added, and the solution is stirred for 48 hours, and then 4.75 g of anhydrous acetic acid and 3.68 g of pyridine are added thereto and further stirred for 24 hours to provide a poly(imide-amide) copolymer solution.

The obtained poly(imide-amide) copolymer solution is coated on a glass plate and cast, and dried on a hot plate at 80° C. for one hour to remove a solvent, and then the coated glass plate is placed into an oven and heated at a heating rate of 3° C. per a minute from room temperature to 250° C. Subsequently, the glass plate is slowly cooled, and finally, the poly(imide-amide) copolymer film is separated from the glass plate to obtain the poly(imide-amide) copolymer film having a thickness of about 50 μm.

A refractive index of the obtained poly(imide-amide) copolymer film is 1.68. The refractive index is set to the Gen-Osc model in a visible region with an Ellipsometer (M-2000, J. A. Woollam), and the value at a wavelength of 550 nm is measured.

Example and Comparative Example: Fabrication of Laminated Film

Example 1

The poly(imide-urethane) copolymer solution obtained from Preparation Example 1 is diluted in 10 wt % in methyl isobutyl ketone (MIBK) and bar-coated on the poly(imide-amide) copolymer film obtained from Preparation Example 6, and then a solvent is removed in a drying oven to provide a polymer film having a thickness of about 1 μm.

Subsequently, the hard coating layer-forming solution obtained from Preparation Example 5-3 is bar-coated on the polymer film, and a solvent is removed in a drying oven and cured at 380 mJ/cm$^2$ using a UV hardening device (LC6B, Fusion UV) to provide a hard coating layer having a thickness of 10 μm, so a laminated film is obtained.

In the obtained laminated film, a refractive index of the optical enhancement layer made from the poly(imide-urethane) copolymer is 1.58. The refractive index is set to the Gen-Osc model in a visible region with an Ellipsometer (M-2000, J. A. Woollam), and the value at a wavelength of 550 nm is taken.

Example 2

The poly(imide-siloxane) copolymer solution obtained from Preparation Example 2 is diluted in 10 wt % in methyl isobutyl ketone (MIBK) and bar-coated on the poly(imide-amide) copolymer film obtained from Preparation Example 6, and a solvent is removed in a drying oven to provide a polymer film having a thickness of about 1 μm.

Subsequently, the hard coating layer-forming solution obtained from Preparation Example 5-3 is bar-coated on the polymer film, and a solvent is removed in a drying oven and cured at 100 to 500 mJ/cm$^2$ using a UV hardening device (LC6B, Fusion UV) to provide a hard coating layer having a thickness of 10 μm, so a laminated film is obtained.

In the obtained laminated film, a refractive index of the optical enhancement layer made from the poly(imide-siloxane) copolymer is 1.59. The refractive index is set to the Gen-Osc model in a visible region with an Ellipsometer (M-2000, J. A. Woollam), and the value at a wavelength of 550 nm is measured.

Example 3

The poly(imide-amide-siloxane) copolymer solution obtained from Preparation Example 3 is diluted in 10 wt % in methyl isobutyl ketone (MIBK) and bar-coated on a poly(imide-amide) copolymer film obtained from Preparation Example 6, and a solvent is removed in a drying oven to provide a polymer film having a thickness of about 1 μm.

Subsequently, the hard coating layer-forming solution obtained from Preparation Example 5-3 is bar-coated on the polymer film, and a solvent is removed in a drying oven and cured at 380 mJ/cm$^2$ using a UV hardening device (LC6B, Fusion UV) to provide a hard coating layer having a thickness of 10 μm, so a laminated film is obtained.

In the obtained laminated film, a refractive index of the optical enhancement layer made from the poly(imide-amide-siloxane) copolymer is 1.59. The refractive index is set to the Gen-Osc model in a visible region with an Ellipsometer (M-2000, J. A. Woollam), and the value at a wavelength of 550 nm is taken.

Example 4

The poly(imide-amide) copolymer solution obtained from Preparation Example 4 is diluted in 10 wt % in methyl isobutyl ketone (MIBK) and bar-coated on a poly(imide-amide) copolymer film obtained from Preparation Example 6, and a solvent is removed in a drying oven to provide a polymer film having a thickness of about 1 μm.

Subsequently, the hard coating layer-forming solution obtained from Preparation Example 5-3 is bar-coated on the polymer film, and a solvent is removed in a drying oven and cured at 380 mJ/cm$^2$ using a UV hardening device (LC6B, Fusion UV) to provide a hard coating layer having a thickness of 10 μm, so a laminated film is obtained.

In the obtained laminated film, a refractive index of the optical enhancement layer made from the poly(imide-amide) copolymer is 1.60. The refractive index is set to the Gen-Osc model in a visible region with an Ellipsometer (M-2000, J. A. Woollam), and the value at a wavelength of 550 nm is taken.

Example 5

5 parts by weight of trisilanolphenyl polyhedral oligomeric silsesquioxane (tsp-POSS) represented by Chemical Formula 5-1 is added to the solution including 100 parts by weight of poly(imide-urethane) copolymer prepared by Preparation Example 1, and the resulting solution is diluted to a concentration of 10 wt % in MIBK, and bar-coated on a poly(imide-amide) copolymer film obtained from Preparation Example 6, and then a solvent is removed in a drying oven to provide a polymer film having a thickness of about 1 μm.

Subsequently, the hard coating layer-forming solution obtained from Preparation Example 5-3 is bar-coated on the polymer film, and a solvent is removed in a drying oven and cured at 380 mJ/cm$^2$ using a UV hardening device (LC6B, Fusion UV) to provide a hard coating layer having a thickness of 10 μm, so a laminated film is obtained.

In the obtained laminated film, a refractive index of the optical enhancement layer made from a solution including 5 parts by weight of tsp-POSS based on 100 parts by weight of the poly(imide-urethane) copolymer is 1.55. The refractive index is set to the Gen-Osc model in a visible region with an Ellipsometer (M-2000, J. A. Woollam), and the value at a wavelength of 550 nm is measured.

Example 6

The poly(imide-amide) copolymer solution obtained from Preparation Example 1 is diluted in 10 wt % in MIBK and bar-coated on a poly(imide-amide) copolymer film obtained from Preparation Example 6, and a solvent is removed in a drying oven to provide a polymer film having a thickness of about 1 µm.

Subsequently, the hard coating layer-forming solution obtained from Preparation Example 5-3 is bar-coated on the poly(imide-amide) copolymer film obtained from Preparation Example 6 at an opposite position to the side where the polymer film is formed, instead of being coated on the polymer film having a thickness of about 1 µm, and a solvent is removed in a drying oven and cured at 380 mJ/cm$^2$ using a UV hardening device (LC6B, Fusion UV) to provide a hard coating layer having a thickness of 10 µm, so a laminated film is obtained.

In other words, in the laminated film obtained from Example 6, unlike the laminated films according to Examples 1 to 5, a hard coating layer 300 is present on the light transmitting substrate 100, and an optical enhancement layer 200 is present under the light transmitting substrate 100.

In the obtained laminated film, a refractive index of the optical enhancement layer made from the poly(imide-urethane) copolymer is 1.58, as in Example 1.

Comparative Example 1: Fabrication of Laminated Film Having Only Hard Coating Layer on Light Transmitting Substrate The hard coating layer-forming solution obtained from Preparation Example 5-3 is bar-coated on the poly(imide-amide) copolymer film obtained from Preparation Example 6, and a solvent is removed in a drying oven and cured at 380 mJ/cm$^2$ using a UV hardening device (LC6B, Fusion UV) to provide a hard coating layer having a thickness of 10 µm, so a laminated film is obtained.

Comparative Example 2: Production of Laminated Film Including Commercially Available Primer Layer Between Light Transmitting Substrate and Hard Coating Layer A primer composition including a polymethylmethacrylate (PMMA)-containing polymer and having a refractive index of 1.35 available from Flucon is bar-coated on the poly(imide-amide) copolymer film obtained from Preparation Example 6, and a solvent is removed in a drying oven to provide a polymer film having a thickness of about 1 µm.

Subsequently, the hard coating layer-forming solution obtained from Preparation Example 5-3 is bar-coated on the polymer film, and a solvent is removed in a drying oven and cured at 380 mJ/cm$^2$ using a UV hardening device (LC6B, Fusion UV) to provide a hard coating layer having a thickness of 10 µm, so a laminated film is obtained.

Evaluation: Evaluation of Optical Properties and Rainbow Mura Presence

The laminated films obtained from Examples 1 to 6 and Comparative Examples 1 and 2 are evaluated for optical properties and rainbow mura presence, and the results are shown in the following Tables 1 and 2. Specifically, for the optical properties of the film, a transmittance, a yellowness index (YI), and haze are measured, and the rainbow mura is observed by the naked eye, and each of them is measured by the following method.

(1) Yellow index (YI) and transmittance (Tr (%), transmittance in a range of 350 nm to 750 nm) are measured with reference to a film having a thickness of about 60 µm using a spectrophotometer manufactured by Minolta, CM-3600d, and the results are obtained according to ASTM D1925.

(2) The haze is measured using a spectrophotometer manufactured by Minolta, CM-3600d, and the results are obtained according to ASTM D1003-97.

(3) Measurement method of Rainbow Mura: in order to prevent a side reflection of the laminated film, the surface opposite to the hard coating layer of the laminated film is bonded with a black acryl plate using 50 µm PSA manufactured by 3M, and then the mura degree is evaluated as "strong", "weak," and "no (none)" by observing the hard coating layer surface of the laminated film by naked eyes under a three wave lamp. In addition, an image of the three wave lamp reflected on the hard coating layer surface is taken, and the results are shown in FIGS. 9 and 10.

Figure 9:
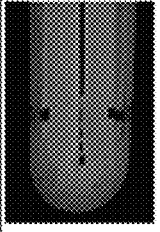
FIG. 9 shows a table containing experimental data of the film of the control group as well as the laminated films manufactured according to Comparative Examples 1 and 2 and Example 1.
Figure 9:
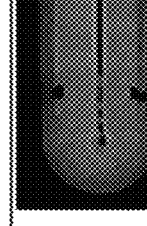
Figure 9:
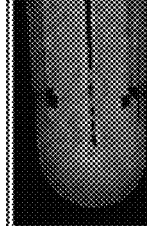
Figure 9:
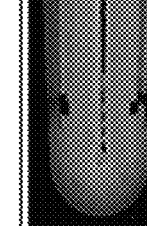

Meanwhile, as a control group, only the poly(imide-amide) copolymer film obtained from Preparation Example 6 is measured for a mura degree, a transmittance, YI, and haze, and the results are shown in FIG. 9.

Figure 10:
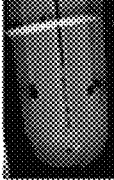
FIG. 10 shows a table containing experimental data of the laminated films manufactured according to Examples 2 to 6.
Figure 10:
Figure 10:
Figure 10:
Figure 10:
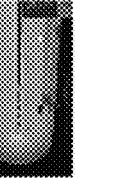

As shown in FIGS. 9 and 10, the laminated films according to Examples 1 to 6 show weak rainbow mura, but the laminated films according to Comparative Examples 1 and 2 show strong rainbow mura. On the other hand, in the case of Control in which only poly(imide-amide) copolymer film is present without forming a hard coating layer, rainbow mura is never shown.

The laminated films according to Examples 1 to 6 show very weak rainbow mura when observed by the naked eye, but show a transmittance of greater than or equal to 90% which is higher than in the films according to Comparative Examples 1 and 2 and the Control. In addition, the yellowness indexes of the laminated films according to Examples 1 to 6 are also lower than films of Control and Comparative Example 1 including no additional layer between the hard coating layer and the poly(imide-amide) copolymer substrate. When the commercially available primer layer is interposed between the hard coating layer and the poly (imide-amide) copolymer according to Comparative Example 2, YI is 2.3 which is relatively low, and the haze is 0.8 which is also low. Comparative Example 2 shows strong rainbow mura and unfavorable color visibility.

The laminated films according to Examples 1 and 6 include the same poly(imide-amide) copolymer substrate, the same hard coating layer, and the same composition optical enhancement layer, but the position of the optical enhancement layer 200 is different. In all cases of the films according to Examples 1 to 5, the poly(imide-amide) copolymer substrate film (light transmitting substrate 100), the optical enhancement layer 200, and the hard coating layer 300 are orderly laminated, but in the case of Example 6, the optical enhancement layer 200 is disposed on the opposite surface to the hard coating layer 300 leaving a center of the substrate film 100, instead of being interposed between the poly(imide-amide) copolymer substrate film 100 and the hard coating layer 300. Examples 1 to 6 show weak rainbow mura and excellent optical properties. Particularly, as in Example 6, the laminated film in which the optical enhancement layer 200 is present in an opposite side to the hard coating layer 300 has optical properties superior to the optical properties of the laminated film in which the optical enhancement layer 200 is present between the poly(imide-amide) copolymer substrate film 100 and the hard coating layer 300 as in Example 1.

As shown in the Examples and Comparative Examples, in the laminated film including the poly(imide-amide) copolymer substrate film 100 and the hard coating layer 300, when an optical enhancement layer 200 including a polyimide-based copolymer is disposed between the two layers or is disposed on an opposite side to the hard coating layer 300 leaving a center of the poly(imide-amide) copolymer substrate film 100, it may reduce an interfacial reflection and a photo interference by compensating for a refractive index difference between the poly(imide-amide) copolymer substrate film 100 and the hard coating layer 300 to suppress a mura appearance, resulting in a laminated film that has excellent color visibility and excellent appearance quality. The laminated film may be usably employed as a window film of the display device required to have an excellent appearance quality.

While this disclosure has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:

1. A laminated film comprising
   a light transmitting substrate;
   a hard coating layer; and
   an optical enhancement layer disposed between the light transmitting substrate and the hard coating layer or at a position facing the hard coating layer with the light transmitting substrate therebetween,
   wherein the light transmitting substrate comprises a polyimide, a poly(amide-imide) copolymer, or a combination thereof, and
   the optical enhancement layer comprises a copolymer comprising a polyimide, wherein the copolymer comprising the polyimide comprises (a) an imide structural unit, and (b) a urethane structural unit, a siloxane structural unit, or a combination thereof, and
   wherein a refractive index of the optical enhancement layer has a value between a refractive index of the light transmitting substrate and a refractive index of the hard coating layer.

2. The laminated film of claim 1, wherein the light transmitting substrate has a thickness of about 30 μm to about 200 μm and the optical enhancement layer has a thickness of about 0.1 μm to about 8 μm.

3. The laminated film of claim 1, wherein the refractive index of the optical enhancement layer is about 1.5 to about 1.7.

4. The laminated film of claim 1, wherein the copolymer comprising the polyimide of the optical enhancement layer further comprises an amide structural unit.

5. The laminated film of claim 1, wherein the imide structural unit is represented by Chemical Formula 1:

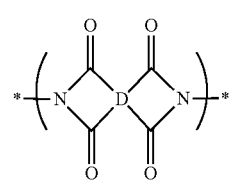

(Chemical Formula 1)

wherein, in Chemical Formula 1,

D comprises a substituted or unsubstituted quadrivalent C4 to C30 alicyclic organic group, a substituted or unsubstituted quadrivalent C6 to C30 aromatic organic group, a substituted or unsubstituted quadrivalent C4 to C30 heteroaromatic organic group, or a combination thereof, and the alicyclic organic group, the aromatic organic group, the heteroaromatic organic group, or the combination thereof is a single ring, a condensed ring in which at least two rings are fused, or a ring system that comprises at least two ring groups, each of the at least two ring groups comprises the single ring or the condensed ring, wherein the at least two ring groups are linked by a single bond, a fluorenylene group, —O—, —S—, —C(=O)—, —CH(OH)—, —S(=O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, —(CH$_2$)$_p$—C(C$_n$F$_{2n+1}$)$_2$—(CH$_2$)$_q$—, wherein, 1≤n≤10, 1≤p≤10 and 1≤q≤10, —C(CF$_3$)(C$_6$H$_5$)—, —C(=O)NH—, or a combination thereof.

6. The laminated film of claim 1, wherein the urethane structural unit is represented by Chemical Formula 2:

(Chemical Formula 2)

wherein, in Chemical Formula 2,

Y and Z are each independently a substituted or unsubstituted divalent C1 to C30 aliphatic organic group, a substituted or unsubstituted divalent C3 to C30 alicyclic organic group, a substituted or unsubstituted C6 to C30 aromatic organic group, a substituted or unsubstituted C2 to C30 heteroaromatic organic group, or a combination thereof, and the alicyclic organic group, the aromatic organic group, the heteroaromatic organic group, or the combination thereof is a single ring, a condensed ring in which at least two rings are fused, or a ring system that comprises at least two ring groups, each of the at least two ring groups comprises the single ring or the condensed ring, wherein the at least two ring groups are linked by a single bond, a fluorenylene group, —O—, —S—, —C(=O)—, —CH(OH)—, —S(=O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, —(CH$_2$)$_p$—C(C$_n$F$_{2n+1}$)$_2$—(CH$_2$)$_q$—, wherein 1≤n≤10, 1≤p≤10 and 1≤q≤10, —C(CF$_3$)(C$_6$H$_5$)—, —C(=O)NH—, or a combination thereof.

7. The laminated film of claim 1, wherein the siloxane structural unit is represented by Chemical Formula 3:

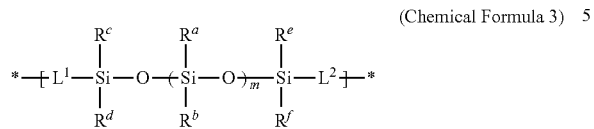

(Chemical Formula 3)

wherein, in Chemical Formula 3, $R^a$ to $R^f$ are each independently a substituted or unsubstituted C1 to C30 alkyl group, a substituted or unsubstituted C2 to C30 alkenyl group, a substituted or unsubstituted C2 to C30 alkynyl group, a substituted or unsubstituted C1 to C30 alkoxy group, a substituted or unsubstituted C3 to C30 cycloalkyl group, a substituted or unsubstituted C6 to C30 aryl group, an epoxide-containing group, or a combination thereof, $L^1$ and $L^2$ are each independently a single bond, —O—, a substituted or unsubstituted C1 to C30 alkylene group, a substituted or unsubstituted C1 to C30 heteroalkylene group, a substituted or unsubstituted C2 to C30 alkenylene group, a substituted or unsubstituted C3 to C30 cycloalkylene group, a substituted or unsubstituted C2 to C30 heterocycloalkylene group, a substituted or unsubstituted C6 to C30 arylene group, a substituted or unsubstituted C2 to C30 heteroarylene group, or a combination thereof, and m is an integer from 0 to 150.

8. The laminated film of claim 4, wherein the amide structural unit is represented by Chemical Formula 4:

(Chemical Formula 4)

wherein, in Chemical Formula 4,

A, $E^1$, and $E^2$ are each independently a substituted or unsubstituted divalent C1 to C30 aliphatic organic group, a substituted or unsubstituted divalent C3 to C30 alicyclic organic group, a substituted or unsubstituted divalent C6 to C30 aromatic organic group, a substituted or unsubstituted divalent C2 to C30 heteroaromatic organic group, or a combination thereof, and the alicyclic organic group, aromatic organic group, heteroaromatic organic group, or the combination thereof is a single ring, a condensed ring in which at least two rings are fused, or a ring system that comprises at least two ring groups, each of the at least two ring groups comprises the single ring or the condensed ring, wherein the at least two rings are linked by a single bond, a fluorenylene group, —O—, —S—, —C(=O)—, —CH(OH)—, —S(=O)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, —(CH$_2$)$_p$—C(C$_n$F$_{2n+1}$)$_2$—(CH$_2$)$_q$—, wherein 1≤n≤10, 1≤p≤10 and 1≤q≤10, —C(CF$_3$)(C$_6$H$_5$)—, —C(=O)NH—, or a combination thereof.

9. The laminated film of claim 1, wherein the optical enhancement layer further comprises a partially condensed polyhedral oligomer silsesquioxane comprising a functional group capable of forming a hydrogen bond at a broken site of at least one —Si—O—Si— bond.

10. The laminated film of claim 9, wherein the partially condensed polyhedral oligomer silsesquioxane is represented by Chemical Formula 5 or Chemical Formula 6:

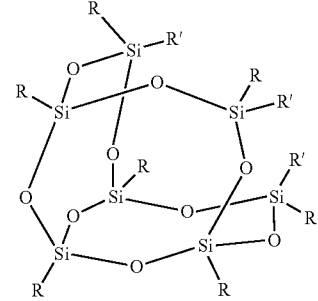

(Chemical Formula 5)

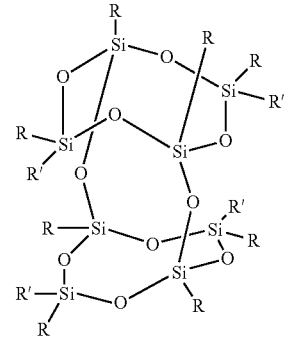

(Chemical Formula 6)

wherein, in Chemical Formula 5 and Chemical Formula 6,

R is each independently a substituted or unsubstituted C1 to C30 alkyl group, a substituted or unsubstituted C3 to C30 cycloalkyl group, a substituted or unsubstituted C6 to C30 aryl group, or a combination thereof, and R' is each independently —OH, —SH, or —NH$_2$.

11. The laminated film of claim 9, wherein the partially condensed polyhedral oligomer silsesquioxane is present in an amount of less than or equal to about 20 parts by mass based on 100 parts by mass of the copolymer comprising the polyimide in the optical enhancement layer.

12. The laminated film of claim 1, wherein the hard coating layer comprises an acrylate-containing polymer, a urethane-containing polymer, an epoxy-containing polymer, a silicon-containing polymer, a polycaprolactone, a urethane-acrylate copolymer, polyrotaxane, a silica-containing inorganic hard coating material, or a combination thereof.

13. The laminated film of claim 12, wherein the hard coating layer comprises a silicon-containing polymer, and the silicon-containing polymer comprises an organopolysiloxane.

14. The laminated film of claim 1, wherein the light transmitting substrate comprises (1) a polyimide comprising an imide structural unit represented by Chemical Formula 1, (2) a poly(amide-imide) copolymer comprising an imide structural unit represented by Chemical Formula 1 and an amide structural unit represented by Chemical Formula 4, or (3) a combination of the polyimide and the poly(amide-imide) copolymer:

(Chemical Formula 1)

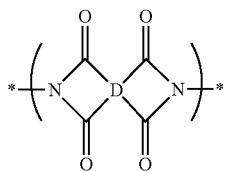

wherein, in Chemical Formula 1,

D is a substituted or unsubstituted quadrivalent C4 to C30 alicyclic organic group, a substituted or unsubstituted quadrivalent C6 to C30 aromatic organic group, or a substituted or unsubstituted quadrivalent C4 to C30 heteroaromatic organic group, or a combination thereof, and the alicyclic organic group, the aromatic organic group, the heteroaromatic organic group, or the combination thereof is a single ring, a condensed ring in which at least two rings are fused, or a ring system that comprises at least two ring groups, each of the at least two ring groups comprises the single ring or the condensed ring, wherein the at least two ring groups are linked by a single bond, a fluorenylene group, —O—, —S—, —C(=O)—, —CH(OH)—, —S(=O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, —(CH$_2$)$_p$—C(C$_n$F$_{2n+1}$)$_2$—(CH$_2$)$_q$—, wherein, 1≤n≤10, 1≤p≤10 and 1≤q≤10, —C(CF$_3$)(C$_6$H$_5$)—, —C(=O)NH—, or a combination thereof;

(Chemical Formula 4)

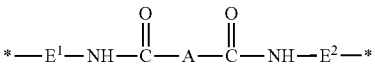

wherein, in Chemical Formula 4,

A, E$^1$, and E$^2$ are each independently a substituted or unsubstituted divalent C1 to C30 aliphatic organic group, a substituted or unsubstituted divalent C3 to C30 alicyclic organic group, a substituted or unsubstituted divalent C6 to C30 aromatic organic group, a substituted or unsubstituted divalent C2 to C30 heteroaromatic organic group, or a combination thereof, and the alicyclic organic group, aromatic organic group, heteroaromatic organic group, or the combination thereof is a single ring, a condensed ring in which at least two rings are fused, or a ring system that comprises at least two ring groups, each of the at least two ring groups comprises the single ring or the condensed ring, wherein the at least two ring groups are linked by a single bond, a fluorenylene group, —O—, —S—, —C(=O)—, —CH(OH)—, —S(=O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, —(CH$_2$)$_p$—C(C$_n$F$_{2n+1}$)$_2$—(CH$_2$)$_q$—, wherein, 1≤n≤10, 1≤p≤10 and 1≤q≤10, —C(CF$_3$)(C$_6$H$_5$)—, —C(=O)NH—, or a combination thereof.

15. The laminated film of claim 1, wherein the hard coating layer has a thickness of about 1 μm to about 30 μm.

16. The laminated film of claim 1, wherein the laminated film has a transmittance of greater than or equal to about 90%.

17. The laminated film of claim 1, wherein the laminated film has a yellowness index of less than about 3.

18. The laminated film of claim 1, wherein the laminated film has a haze of less than or equal to about 2.

19. The laminated film of claim 1, wherein when a reflectance of the laminated film is measured at an incident angle of 45 degrees after attaching the laminated film to a black reflector, an average amplitude of the laminated film in a visible light region is less than or equal to about 0.1%.

20. A display device comprising the laminated film of claim 1.

* * * * *